(12) United States Patent
Tanaka et al.

(10) Patent No.: US 10,731,589 B2
(45) Date of Patent: Aug. 4, 2020

(54) CONTROL DEVICE FOR COMPRESSION-IGNITION ENGINE

(71) Applicant: Mazda Motor Corporation, Aki-gun, Hiroshima (JP)

(72) Inventors: Daisuke Tanaka, Hiroshima (JP); Taichi Masuoka, Hiroshima (JP)

(73) Assignee: Mazda Motor Corporation, Aki-gun, Hiroshima (JP)

(*) Notice: Subject to any disclaimer, the term of this patent is extended or adjusted under 35 U.S.C. 154(b) by 0 days.

(21) Appl. No.: 16/167,891

(22) Filed: Oct. 23, 2018

(65) Prior Publication Data

US 2019/0145337 A1    May 16, 2019

(30) Foreign Application Priority Data

Nov. 10, 2017    (JP) ................................. 2017-217161

(51) Int. Cl.
*F02D 41/30*    (2006.01)
*F02B 1/14*    (2006.01)
(Continued)

(52) U.S. Cl.
CPC ............ *F02D 41/3041* (2013.01); *F02B 1/10* (2013.01); *F02B 1/14* (2013.01); *F02D 13/0261* (2013.01);
(Continued)

(58) Field of Classification Search
CPC .... F02D 41/3041; F02D 35/023; F02D 37/02; F02D 41/0057; F02D 41/0077;
(Continued)

(56) References Cited

U.S. PATENT DOCUMENTS 4,442,814 A * 4/1984 Kubozuka ............... F02P 5/152
123/406.19
4,966,117 A * 10/1990 Kawamura ........... F02P 5/1455
123/406.35
(Continued)

FOREIGN PATENT DOCUMENTS

EP    1164277 A2    12/2001
FR    2914019 A1    9/2008
(Continued)

OTHER PUBLICATIONS

European Patent Office, Extended European Search Report Issued in Application No. 18204785.2, dated May 8, 2019, Germany, 47 pages.

*Primary Examiner* — Sizo B Vilakazi
*Assistant Examiner* — Brian R Kirby
(74) *Attorney, Agent, or Firm* — Alleman Hall Creasman & Tuttle LLP

(57) ABSTRACT

A control device for an on-board compression-ignition engine in which partial compression-ignition combustion including spark ignition (SI) combustion performed by combusting a portion of mixture gas inside a cylinder by spark ignition followed by compression ignition (CI) combustion performed by causing the rest of the mixture gas inside the cylinder to self-ignite is executed within at least a part of an operating range of the engine, is provided. The device includes a detector configured to detect a parameter related to noise caused by the combustion inside the cylinder, and a combustion controller configured to control the combustion inside the cylinder during the partial compression-ignition combustion based on a combustion noise index value identified by the detected parameter of the detector and a given reference value defined as an upper limit of the
(Continued)

combustion noise index value, the reference value increasing as a vehicle speed increases.

6 Claims, 18 Drawing Sheets

(51) Int. Cl.
| | |
|---|---|
| *F02B 1/10* | (2006.01) |
| *F02D 41/40* | (2006.01) |
| *F02D 13/02* | (2006.01) |
| *F02D 41/00* | (2006.01) |
| *F02D 37/02* | (2006.01) |
| *F02D 35/02* | (2006.01) |
| *F02P 5/15* | (2006.01) |
| *F02M 26/33* | (2016.01) |

(52) U.S. Cl.
CPC ........... *F02D 35/023* (2013.01); *F02D 37/02* (2013.01); *F02D 41/0057* (2013.01); *F02D 41/0077* (2013.01); *F02D 41/401* (2013.01); *F02P 5/1502* (2013.01); *F02D 41/006* (2013.01); *F02D 41/0065* (2013.01); *F02D 2041/0015* (2013.01); *F02D 2200/025* (2013.01); *F02D 2200/101* (2013.01); *F02D 2200/501* (2013.01); *F02M 26/33* (2016.02)

(58) Field of Classification Search
CPC ............... F02D 13/0261; F02D 41/401; F02D 2200/501; F02D 2200/025; F02D 2200/101; F02D 41/0065; F02D 41/006; F02D 2041/0015; F02P 5/1502; F02B 1/10; F02B 1/14; F02M 26/33
USPC .................. 123/294, 406.21, 406.22, 406.29
See application file for complete search history.

(56) References Cited

U.S. PATENT DOCUMENTS

| | | | | | |
|---|---|---|---|---|---|
| 5,134,980 | A * | 8/1992 | Sakakibara | ........... | F02D 35/027 123/406.35 |
| 5,140,962 | A * | 8/1992 | Iwata | .................... | G01L 23/225 123/406.35 |
| 6,609,493 | B2 * | 8/2003 | Yamaguchi | ............. | F02D 37/02 123/299 |
| 7,240,659 | B2 * | 7/2007 | Yang | .................... | F02D 41/3041 123/295 |
| 8,291,888 | B2 * | 10/2012 | Itano | ........................ | F02P 5/152 123/406.33 |
| 8,851,050 | B2 * | 10/2014 | Shishime | ............ | F02D 13/0238 123/406.29 |
| 9,382,834 | B2 * | 7/2016 | Dieler | ..................... | F02B 11/00 |
| 10,480,479 | B2 * | 11/2019 | Nakashima | ............... | F02B 1/12 |
| 2001/0052335 | A1 * | 12/2001 | Miyakubo | ........... | F02D 13/0265 123/305 |
| 2002/0073957 | A1 * | 6/2002 | Urushihara | ......... | F02D 41/3041 123/299 |
| 2006/0144365 | A1 * | 7/2006 | Miyashita | ............. | F02D 41/401 123/431 |
| 2007/0213919 | A1 * | 9/2007 | Magarida | ................ | F02D 41/10 701/102 |
| 2007/0272203 | A1 * | 11/2007 | Sloane | .................. | F02B 17/005 123/295 |
| 2008/0264149 | A1 * | 10/2008 | Hazelton | ............. | G01M 15/042 73/35.06 |
| 2009/0025688 | A1 * | 1/2009 | Asano | ................. | F02D 41/2438 123/478 |
| 2009/0173296 | A1 * | 7/2009 | O'Neill | .................... | F01L 1/143 123/90.16 |
| 2009/0194081 | A1 * | 8/2009 | Ito | .......................... | F02B 69/02 123/575 |
| 2009/0259387 | A1 * | 10/2009 | Kakuya | ................. | F02D 41/307 701/103 |
| 2010/0023240 | A1 * | 1/2010 | Haskara | ............. | F02D 41/3836 701/103 |
| 2010/0063658 | A1 * | 3/2010 | Martin | ................... | B60W 20/13 701/22 |
| 2010/0222985 | A1 * | 9/2010 | Yun | ....................... | F02D 41/401 701/103 |
| 2011/0108001 | A1 * | 5/2011 | Lee | ........................ | F02B 23/101 123/305 |
| 2012/0046847 | A1 * | 2/2012 | Haskara | ................ | F02D 35/023 701/102 |
| 2012/0106748 | A1 * | 5/2012 | Peachey | ................. | G10K 15/04 381/61 |
| 2012/0118275 | A1 * | 5/2012 | Kang | ...................... | F02D 37/02 123/568.11 |
| 2012/0316757 | A1 * | 12/2012 | Yun | ...................... | F02D 35/028 701/105 |
| 2013/0080026 | A1 * | 3/2013 | Kang | ...................... | F02D 13/0207 701/102 |
| 2014/0012487 | A1 * | 1/2014 | Jung | ....................... | F02D 41/30 701/104 |
| 2014/0331959 | A1 * | 11/2014 | Doran | ..................... | F02B 11/00 123/27 R |
| 2015/0053171 | A1 * | 2/2015 | Sasaki | ..................... | F02B 11/00 123/27 R |
| 2015/0144106 | A1 * | 5/2015 | Juvenelle | ............... | F02D 35/028 123/445 |
| 2016/0025032 | A1 * | 1/2016 | Jung | ...................... | F02D 35/028 701/104 |
| 2016/0059844 | A1 * | 3/2016 | Ikedaya | ................. | B60W 10/18 701/22 |
| 2016/0123269 | A1 * | 5/2016 | Iwata | ..................... | F02D 41/26 701/104 |
| 2016/0146125 | A1 * | 5/2016 | Jung | ...................... | F02D 41/22 123/478 |
| 2016/0201586 | A1 * | 7/2016 | Serrano | ..................... | F02D 41/3058 701/111 |
| 2016/0333818 | A1 * | 11/2016 | Ochi | ...................... | F02D 41/401 |
| 2016/0341135 | A1 * | 11/2016 | Shirahashi | ............ | F02D 35/027 |
| 2017/0067406 | A1 * | 3/2017 | Jung | ...................... | F02D 41/402 |
| 2017/0292462 | A1 * | 10/2017 | Tsuda | ..................... | F02D 13/0273 |
| 2018/0216592 | A1 * | 8/2018 | Sakai | ..................... | F02B 31/085 |
| 2018/0306131 | A1 * | 10/2018 | Tsuda | ........................ | F02P 5/15 |
| 2019/0145337 | A1 * | 5/2019 | Tanaka | ................. | F02D 41/3041 123/294 |
| 2019/0309699 | A1 * | 10/2019 | Inoue | ..................... | F02P 9/00 |

FOREIGN PATENT DOCUMENTS

| | | | |
|---|---|---|---|
| JP | 2009108778 | A | 5/2009 |
| JP | 2012246783 | A | 12/2012 |
| JP | 2015068194 | A * | 4/2015 |
| JP | 2015068194 | A | 4/2015 |
| WO | 2015129285 | A1 | 9/2015 |

* cited by examiner

CONTROL DEVICE FOR COMPRESSION-IGNITION ENGINE

TECHNICAL FIELD

The present disclosure relates to a control device for an on-board compression-ignition engine, which executes partial compression-ignition combustion in which a mixture gas within a cylinder is partially combusted by spark-ignition (SI combustion) and then the remaining mixture gas within the cylinder is combusted by self-ignition (CI (Compression Ignition) combustion).

BACKGROUND OF THE DISCLOSURE

Recently, HCCI (Homogeneous-Charge Compression Ignition) combustion in which gasoline fuel mixed with air is combusted by self-ignition inside a sufficiently compressed cylinder has attracted attention. The HCCI combustion is a mode in which the mixture gas combusts at a plurality of positions simultaneously, and thus has a higher combustion speed of the mixture gas than in SI combustion (spark-ignition combustion) which is adopted for general gasoline engines. Therefore, the HCCI combustion is said to be significantly advantageous in terms of thermal efficiency. However, the HCCI combustion has issues such as a combustion start timing of the mixture gas (a timing that the mixture gas self-ignites) greatly varying due to an external factor (e.g., atmospheric temperature) and a control during a transient operation in which an engine load sharply changes is difficult.

Therefore, instead of combusting the entire mixture gas by self-ignition, it is proposed to combust a portion of the mixture gas by spark-ignition using a spark plug. That is, after forcibly combusting a portion of the mixture gas through flame propagation caused by spark-ignition (SI combustion), the remaining mixture gas is combusted by self-ignition (CI combustion). Hereinafter, such combustion is referred to as "partial compression-ignition combustion."

For example, JP2009-108778A discloses an engine adopting a similar concept to the partial compression-ignition combustion. This engine causes flame propagation combustion by spark-igniting a stratified mixture gas which is formed around a spark plug by a supplementary fuel injection, and then performs a main fuel injection inside a cylinder warmed up by an effect of the flame propagation combustion, so as to combust through self-ignition the fuel injected in the main fuel injection.

Here, in engines adopting the partial compression-ignition combustion, since the CI combustion in which the combustion speed of the mixture gas is high (thus, a pressure increase rate easily rises) is performed at least partially, combustion noise increases more easily compared to normal gasoline engines which only perform the SI combustion (spark-ignition combustion). Therefore, during the partial compression-ignition combustion, it is desirable to adjust a given control amount regarding combustion so that the combustion noise does not increase excessively (i.e., the ratio of the CI combustion does not increase excessively). However, when an upper limit of a combustion noise index value as a reference for adjusting the control amount is uniformly set disregarding the state of the engine or the vehicle, an adjustment in the control amount, which deviates from the combustion noise actually perceived by a passenger, is performed. Thus, the ratio of the CI combustion may be reduced unnecessarily or not reduced when required and harsh combustion noise may be transmitted to the passenger.

SUMMARY OF THE DISCLOSURE

The present disclosure is made in view of the above situations and aims to provide a control device for a compression-ignition engine, which appropriately controls combustion while considering combustion noise which is actually perceived by a person(s) in a cabin.

In order to solve the issues, according to one aspect of the present disclosure, a control device for an on-board compression-ignition engine in which partial compression-ignition combustion including spark ignition (SI) combustion performed by combusting a portion of a mixture gas inside a cylinder by spark ignition followed by compression (CI) combustion performed by causing the remaining mixture gas inside the cylinder to self-ignite is executed within at least a part of an operating range of the engine, is provided. The device includes a detector configured to detect a parameter related to noise caused by the combustion inside the cylinder, and a combustion controller configured to control the combustion inside the cylinder during the partial compression-ignition combustion based on a combustion noise index value identified by the detected parameter of the detector and a given reference value defined as an upper limit of the combustion noise index value, the reference value increasing as a vehicle speed increases.

When the vehicle speed is high, compared to when it is low, sound transmitted inside a cabin as the vehicle travels and the engine operates (hereinafter, referred to as "background noise") increases and other sounds are mixed with this background noise and are not easily perceived. Therefore, hypothetically if the combustion noise of the engine is fixed, the level of the combustion noise actually perceived by a passenger inside the cabin decreases as the vehicle speed increases. In consideration of this, according to this configuration, the reference value of the combustion noise index value is set higher as the vehicle speed increases, and the combustion is controlled based on the reference value. Therefore, the ratio of the CI combustion is increased as much as possible while keeping combustion noise which is actually perceived by the passenger to an adequate level.

For example, when the reference value is set uniformly disregarding the vehicle speed, the reference value needs to be set sufficiently low so that the combustion noise is not easily perceived by the passenger even when the background noise takes the smallest value, i.e., when the vehicle speed is low. However, by doing this, the combustion is constantly controlled based on the low reference value, the ratio of the CI combustion may decrease significantly and the fuel efficiency improving effect may drop. In this regard, as this configuration, when the reference value is set to increase as the vehicle speed increases, since the ratio of the CI combustion is not lowered excessively to reduce combustion noise more than necessary, while comfort of the passenger is properly secured, the ratio of the CI combustion is increased as much as possible to effectively improve fuel efficiency.

The reference value may be set so that a change rate of the reference value when the vehicle speed changes while an engine load remains unchanged is larger in a low speed range in which the vehicle speed is below a given value than in a high speed range in which the vehicle speed is the given value or higher.

According to this configuration, the suitable reference value is set in consideration of a characteristic that the engine sound transmitted into the cabin (a mixed sound of a mechanical sound of the engine, a combustion sound, an exhaust sound, etc.) changes non-linearly with respect to the engine speed, i.e., a characteristic that the change rate of the engine sound (the increase rate of the engine sound corresponding to the increase of the vehicle speed) becomes higher in the low speed range than in the high speed range, and the combustion noise is kept at an adequate level by using the reference value.

A first characteristic that defines the reference value when the engine load is fixed at a low load and a second characteristic that defines the reference value when the engine load is fixed at a high load, may be defined in advance. At least the first characteristic may be set so that the change rate of the reference value with respect to the vehicle speed is larger in the low speed range than in the high speed range.

The non-linearly characteristic of the engine sound clearly appears when the engine load is low. Thus, according to this configuration in which at least the first characteristic for the low load is set to the tendency as described above (the change rate of the reference value is larger in the low speed range than in the high speed range), the reference value appropriately reflecting the change rate of the engine sound in the low load and low speed condition can be set.

When the engine load currently falls neither within the low load nor the high load, the combustion controller may identify the reference value corresponding to the current engine load by an interpolation processing using the reference values defined for the first characteristic and the second characteristic.

According to this configuration, since there is no need to store characteristics of the multiple reference values corresponding to various engine load conditions in advance, while avoiding an unnecessary increase in the data amount to be stored, the reference values in various engine load conditions are properly determined by the interpolation processing.

The combustion controller may determine a target start timing that is a target start timing of the CI combustion as a timing at which the combustion noise index value does not exceed the reference value, and control the combustion inside the cylinder so as to achieve the determined target start timing.

According to this configuration, by adjusting the target start timing having a large influence on the combustion noise index value, the ratio of the CI combustion is increased as much as possible while keeping combustion noise adequate.

The detector may be an in-cylinder pressure sensor configured to detect pressure inside the cylinder as the parameter.

According to this configuration, the combustion noise index value is appropriately calculated by using the detected parameter of the in-cylinder pressure sensor.

According to another aspect of the present disclosure, a control device for an on-board compression-ignition engine in which partial compression-ignition combustion including SI combustion performed by combusting a portion of a mixture gas inside a cylinder by spark ignition followed by CI combustion performed by causing the remaining mixture gas inside the cylinder to self-ignite is executed within at least a part of an operating range of the engine, is provided. The device includes a detector configured to detect a parameter related to noise caused by the combustion inside the cylinder, and a combustion controller configured to control the combustion inside the cylinder during the partial compression-ignition combustion based on a combustion noise index value identified by the detected parameter of the detector and a given reference value defined as an upper limit of the combustion noise index value, the reference value increasing as an engine speed increases.

According to another aspect of the present disclosure, a control device for an on-board compression-ignition engine in which partial compression-ignition combustion including SI combustion performed by combusting a portion of a mixture gas inside a cylinder by spark ignition followed by CI combustion performed by causing the remaining mixture gas inside the cylinder to self-ignite is executed within at least a part of an operating range of the engine, is provided. The device includes a detector configured to detect a parameter related to noise caused by the combustion inside the cylinder, and a combustion controller configured to control the combustion inside the cylinder during the partial compression-ignition combustion based on a combustion noise index value identified by the detected parameter of the detector and a given reference value defined as an upper limit of the combustion noise index value, the reference value increasing as an engine load increases.

The sound transmitted inside the cabin increases when the vehicle speed is high, compared to when it is low, and increases when the vehicle load is high, compared to when it is low. According to these configurations, the reference value of the combustion noise index value is set higher as the vehicle speed or load increases. Therefore, similar to the above configuration, the ratio of the CI combustion is increased as much as possible while keeping the combustion noise which is actually perceived by the passenger to an adequate level.

BRIEF DESCRIPTION OF THE DRAWINGS

FIGS. 16A and 16B show charts illustrating that background noise transmitted into a cabin changes depending on a condition, in which FIG. 16A illustrates a relationship between a vehicle traveling sound and a vehicle speed and FIG. 16B illustrates a relationship between an engine sound and an engine speed.

DETAILED DESCRIPTION OF THE DISCLOSURE (1) Overall Configuration of Engine

Figure 1:
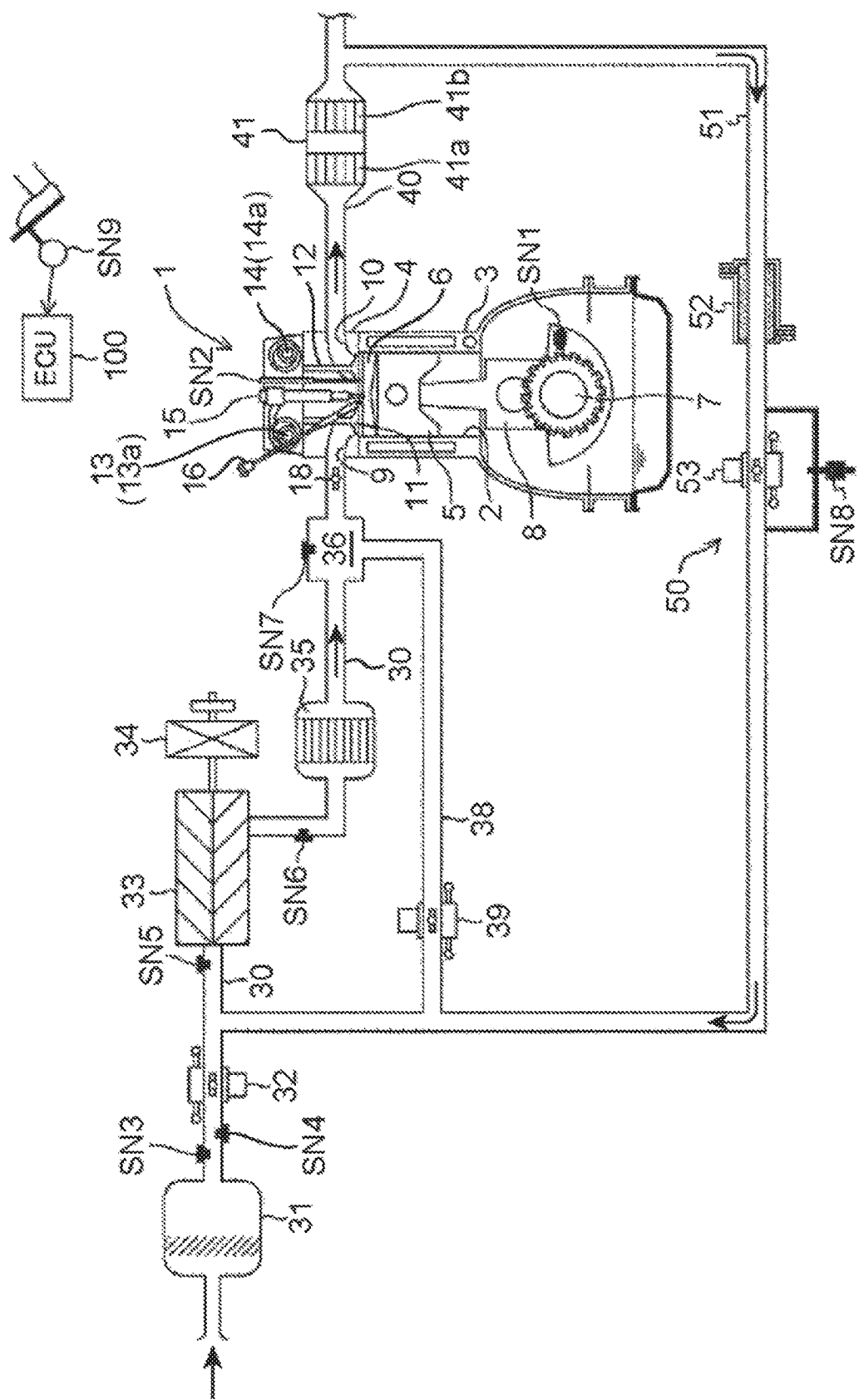
FIG. 1 is a system diagram schematically illustrating an overall configuration of a compression-ignition engine according to one embodiment of the present disclosure.
Figure 2:
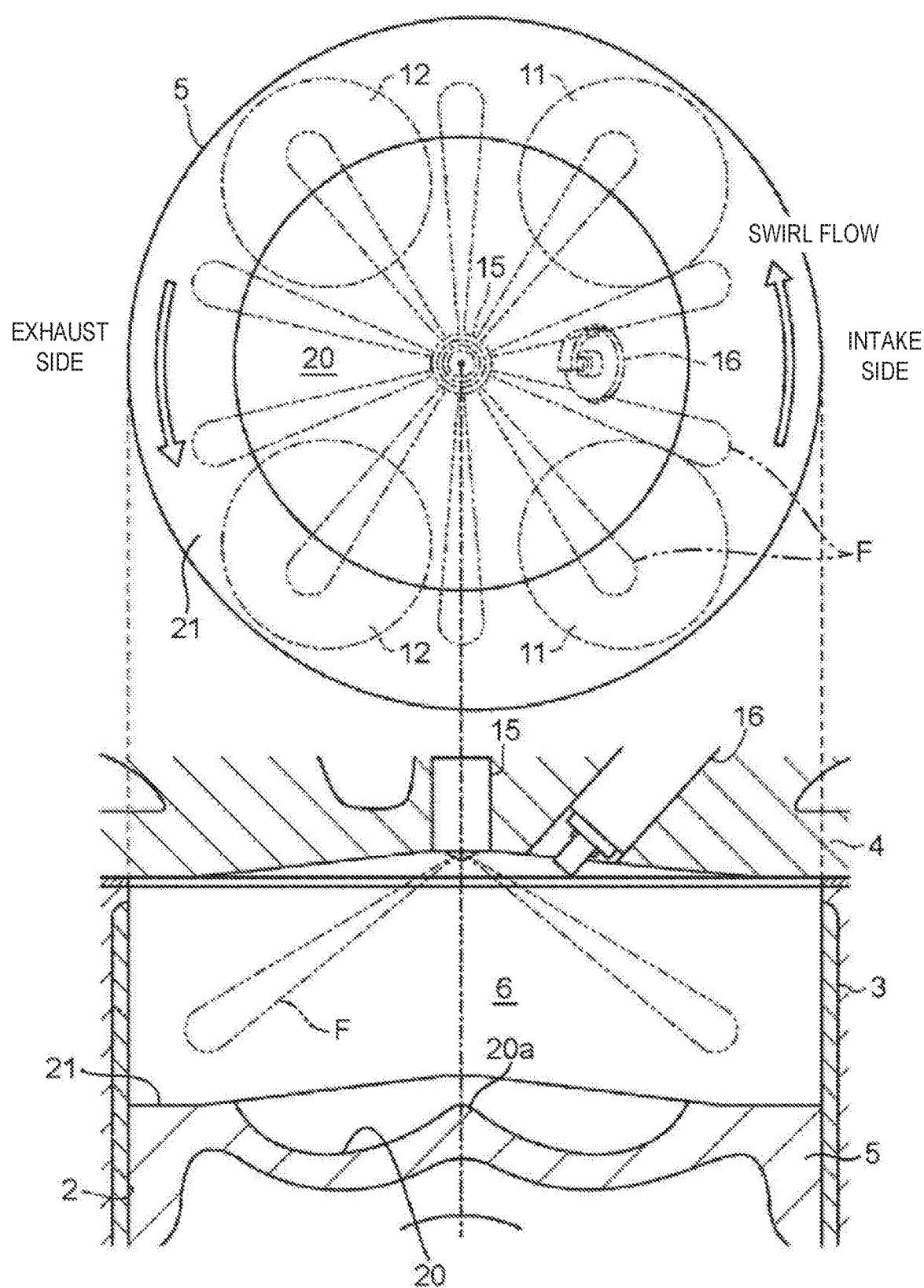
FIG. 2 shows diagrams illustrating a cross-sectional view of an engine body and a plan view of a piston.

FIGS. 1 and 2 are diagrams illustrating a suitable embodiment of a compression-ignition engine (hereinafter, simply referred to as "the engine") to which a control device of the present disclosure is applied. The engine illustrated in FIGS. 1 and 2 is a four-cycle gasoline direct-injection engine mounted on a vehicle as a drive source for traveling, and includes an engine body 1, an intake passage 30 through which intake air to be introduced into the engine body 1 flows, an exhaust passage 40 through which exhaust gas discharged from the engine body 1 flows, and an exhaust gas recirculation (EGR) device 50 which recirculates a portion of the exhaust gas flowing through the exhaust passage 40 to the intake passage 30.

The engine body 1 has a cylinder block 3 formed therein with cylinders 2, a cylinder head 4 attached to an upper surface of the cylinder block 3 so as to cover above the cylinders 2, and a piston 5 reciprocatably fitted into each cylinder 2. Typically, the engine body 1 is of a multi-cylinder type having a plurality of cylinders (e.g., four cylinders). Here, the description is only given regarding one cylinder 2 for the sake of simplicity.

A combustion chamber 6 is defined above the piston 5, and fuel containing gasoline as a main component is injected into the combustion chamber 6 by an injector 15 (described later). Further, the supplied fuel is combusted while being mixed with air in the combustion chamber 6, and expansion force caused by this combustion pushes down the piston 5 and thus it reciprocates in up-and-down directions of the cylinder. Note that the fuel injected into the combustion chamber 6 may be any fuel as long as it contains gasoline as a main component and, for example, it may contain a subcomponent, such as bioethanol, in addition to gasoline.

A crankshaft 7, which is an output shaft of the engine body 1, is provided below the piston 5. The crankshaft 7 is connected to the piston 5 via a connecting rod 8 and rotates about its center axis according to the reciprocation (up-and-down motion) of the piston 5.

A geometric compression ratio of the cylinder 2, that is, a ratio of the volume of the combustion chamber 6 when the piston 5 is at a top dead center (TDC) with the volume of the combustion chamber 6 when the piston 5 is at a bottom dead center (BDC), is set between 13:1 and 30:1 as a suitable value for SPCCI combustion (partial compression-ignition combustion) described later. More specifically, the geometric compression ratio of the cylinder 2 is set between 14:1 and 17:1 in regular specifications using gasoline fuel having an octane number of about 91, and between 15:1 and 18:1 in high-octane specifications using gasoline fuel having an octane number of about 96.

The cylinder block 3 is provided with a crank angle sensor SN1 which detects a rotational angle of the crankshaft 7 (crank angle) and a rotational speed of the crankshaft 7 (engine speed).

The cylinder head 4 is formed with an intake port 9 and an exhaust port 10 which open into the combustion chamber 6, and provided with an intake valve 11 which opens and closes the intake port 9, and an exhaust valve 12 which opens and closes the exhaust port 10. Note that as illustrated in FIG. 2, the type of valve of the engine of this embodiment is a four-valve type including two intake valves and two exhaust valves. That is, the intake port 9 includes a first intake port 9A and a second intake port 9B, and the exhaust port 10 includes a first exhaust port 10A and a second exhaust port 10B. A total of two intake valves 11 are provided so as to open and close the first and second intake ports 9A and 9B, respectively, and a total of two exhaust valves 12 are provided so as to open and close the first and second exhaust ports 10A and 10B, respectively.

Figure 3:
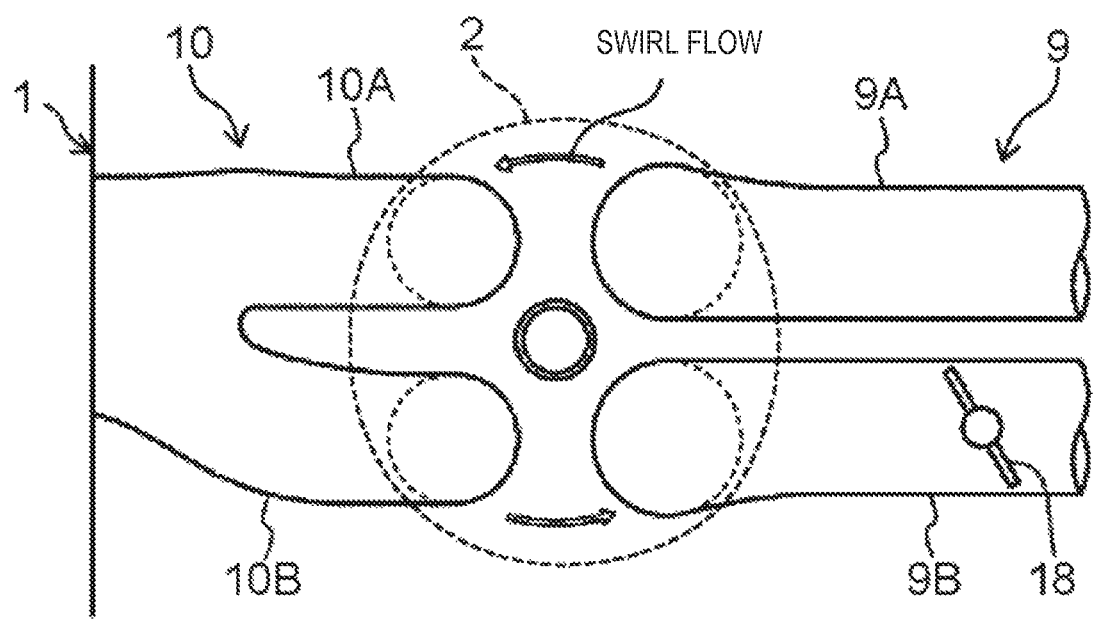
FIG. 3 is a schematic plan view illustrating a structure of a cylinder and intake and exhaust systems in the vicinity thereof.

As illustrated in FIG. 3, a swirl valve 18 openable and closable of the second intake port 9B is provided therein. The swirl valve 18 is only provided in the second intake port 9B, and not provided in the first intake port 9A. When such a swirl valve 18 is driven in the closing direction, since a rate of intake air flowing into the combustion chamber 6 from the first intake port 9A increases, a circling flow circling around an axial line of the cylinder (i.e., swirl flow) is enhanced. Conversely, driving the swirl valve 18 in the opening direction weakens the swirl flow. Note that the intake port 9 of this embodiment is a tumble port formable of a tumble flow. Therefore, the swirl flow formed when closing the swirl valve 18 is an inclined swirl flow mixed with the tumble flow.

The intake valve 11 and the exhaust valve 12 are driven to open and close in conjunction with the rotation of the crankshaft 7 by valve operating mechanisms 13 and 14 including a pair of camshafts disposed in the cylinder head 4.

The valve operating mechanism 13 for the intake valve 11 is built therein with an intake VVT 13a changeable of at least an open timing of the intake valve 11. Similarly, the valve operating mechanism 14 for the exhaust valve 12 is built therein with an exhaust VVT 14a changeable of at least a close timing of the exhaust valve 12. By controlling the intake VVT 13a and the exhaust VVT 14a, in this embodiment, a valve overlap period in which both the intake and exhaust valves 11 and 12 are opened over TDC of exhaust stroke is adjusted, and by adjusting the valve overlap period, an amount of burned gas remaining in the combustion chamber 6 (internal EGR gas) is adjusted. Note that the intake VVT 13a (exhaust VVT 14a) may be a variable mechanism which changes only the open timing (close timing) while fixing the close timing (open timing) of the intake valve 11 (exhaust valve 12), or a phase-variable mechanism which simultaneously changes the open timing and the close timing of the intake valve 11 (exhaust valve 12).

The cylinder head 4 is provided with the injector 15 which injects the fuel (mainly gasoline) into the combustion chamber 6, and a spark plug 16 which ignites the mixture gas containing the fuel injected into the combustion chamber 6 from the injector 15 and air introduced into the combustion chamber 6. The cylinder head 4 is further provided with an in-cylinder pressure sensor SN2 which detects pressure of the combustion chamber 6 (hereinafter, also referred to as "in-cylinder pressure"). Note that the in-cylinder pressure sensor SN2 corresponds to a "detector."

As illustrated in FIG. 2, on a crown surface of the piston 5, a cavity 20 is formed by denting a relatively wide area of the piston 5, including a center part thereof, to the opposite side from the cylinder head 4 (downward). A center section of the cavity 20 is formed with a bulge portion 20a having a substantially conical shape, bulging relatively upward, and both sides of the cavity 20 over the bulge portion 20a in radial directions respectively form a bowl-shaped recessed portion in cross section. In other words, the cavity 20 is a recessed portion having a donut shape in plan view, formed to surround the bulge portion 20a. Further, a section of the crown surface of the piston 5 radially outward of the cavity 20 is a squish portion 21 comprised of an annular flat surface.

The injector 15 is a multi-port injector having a plurality of nozzle ports at its tip portion, and the fuel is injected radially from the plurality of nozzle ports ("F" in FIG. 2 indicates fuel spray injected from the respective nozzle ports). The injector 15 is provided so that its tip portion opposes to the center portion (bulge portion 20a) of the crown surface of the piston 5.

The spark plug 16 is disposed at a somewhat offset position to the intake side with respect to the injector 15. The tip portion (electrode portion) of the spark plug 16 is set at a position overlapping with the cavity 20 in the plan view.

As illustrated in FIG. 1, the intake passage 30 is connected to one side surface of the cylinder head 4 to communicate with the intake port 9. Air (fresh air) taken in from an upstream end of the intake passage 30 is introduced into the combustion chamber 6 through the intake passage 30 and the intake port 9.

In the intake passage 30, an air cleaner 31 which removes foreign matters within the intake air, a throttle valve 32 which adjusts a flow rate of intake air, a booster 33 which pumps the intake air while compressing it, an intercooler 35 which cools the intake air compressed by the booster 33, and a surge tank 36 are provided in order from the upstream side.

An airflow sensor SN3 which detects the flow rate of intake air, first and second intake air temperature sensors SN4 and SN6 which detect a temperature of the intake air, and first and second intake air pressure sensors SN5 and SN7 which detect the pressure of the intake air are provided in various parts of the intake passage 30. The airflow sensor SN3 and the first intake air temperature sensor SN4 are provided in a portion of the intake passage 30 between the air cleaner 31 and the throttle valve 32, and detect the flow rate and the temperature of the intake air passing through this portion. The first intake air pressure sensor SN5 is provided in a portion of the intake passage 30 between the throttle valve 32 and the booster 33 (downstream of a connection port of an EGR passage 51 described later), and detects the pressure of the intake air passing through this portion. The second intake air temperature sensor SN6 is provided in a portion of the intake passage 30 between the booster 33 and the intercooler 35, and detects the temperature of intake air passing through this portion. The second intake air pressure sensor SN7 is provided in the surge tank 36 and detects the pressure of intake air in the surge tank 36.

The booster 33 is a mechanical booster (supercharger) mechanically linked to the engine body 1. Although the specific type of the booster 33 is not particularly limited, for example, any of known boosters, such as Lysholm type, Roots type, or centrifugal type, may be used as the booster 33.

An electromagnetic clutch 34 electrically switchable of its operation mode between "engaged" and "disengaged" is provided between the booster 33 and the engine body 1. When the electromagnetic clutch 34 is engaged, a driving force is transmitted from the engine body 1 to the booster 33, and boosting by the booster 33 is performed. On the other hand, when the electromagnetic clutch 34 is disengaged, the transmission of the driving force is interrupted, and the boosting by the booster 33 is stopped.

A bypass passage 38 which bypasses the booster 33 is provided in the intake passage 30. The bypass passage 38 connects the surge tank 36 to the EGR passage 51 described later. A bypass valve 39 is provided in the bypass passage 38.

The exhaust passage 40 is connected to the other side surface of the cylinder head 4 so as to communicate with the exhaust port 10. Burned gas (exhaust gas) generated in the combustion chamber 6 is discharged outside through the exhaust port 10 and the exhaust passage 40.

A catalytic converter 41 is provided in the exhaust passage 40. The catalytic converter 41 is built therein with a three-way catalyst 41a which purifies hazardous components (HC, CO and $NO_x$) contained within the exhaust gas flowing through the exhaust passage 40, and a GPF (gasoline-particulate filter) 41b which captures particulate matter (PM) contained within the exhaust gas. Note that another catalytic converter built therein with a suitable catalyst, such as a three-way catalyst or a NOR catalyst, may be added downstream of the catalytic converter 41.

The EGR device 50 has the EGR passage 51 connecting the exhaust passage 40 to the intake passage 30, and an EGR cooler 52 and an EGR valve 53 provided in the EGR passage 51. The EGR passage 51 connects a portion of the exhaust passage 40 downstream of the catalytic converter 41 to a portion of the intake passage 30 between the throttle valve 32 and the booster 33. The EGR cooler 52 cools the exhaust gas recirculated from the exhaust passage 40 to the intake passage 30 through the EGR passage 51 (external EGR gas) by heat exchange. The EGR valve 53 is provided in the EGR passage 51 downstream of the EGR cooler 52 (the side closer to the intake passage 30), and adjusts a flow rate of the exhaust gas flowing through the EGR passage 51.

A pressure difference sensor SN8 which detects a difference between pressure upstream of the EGR valve 53 and pressure downstream thereof is provided in the EGR passage 51.

(2) Control System

Figure 4:
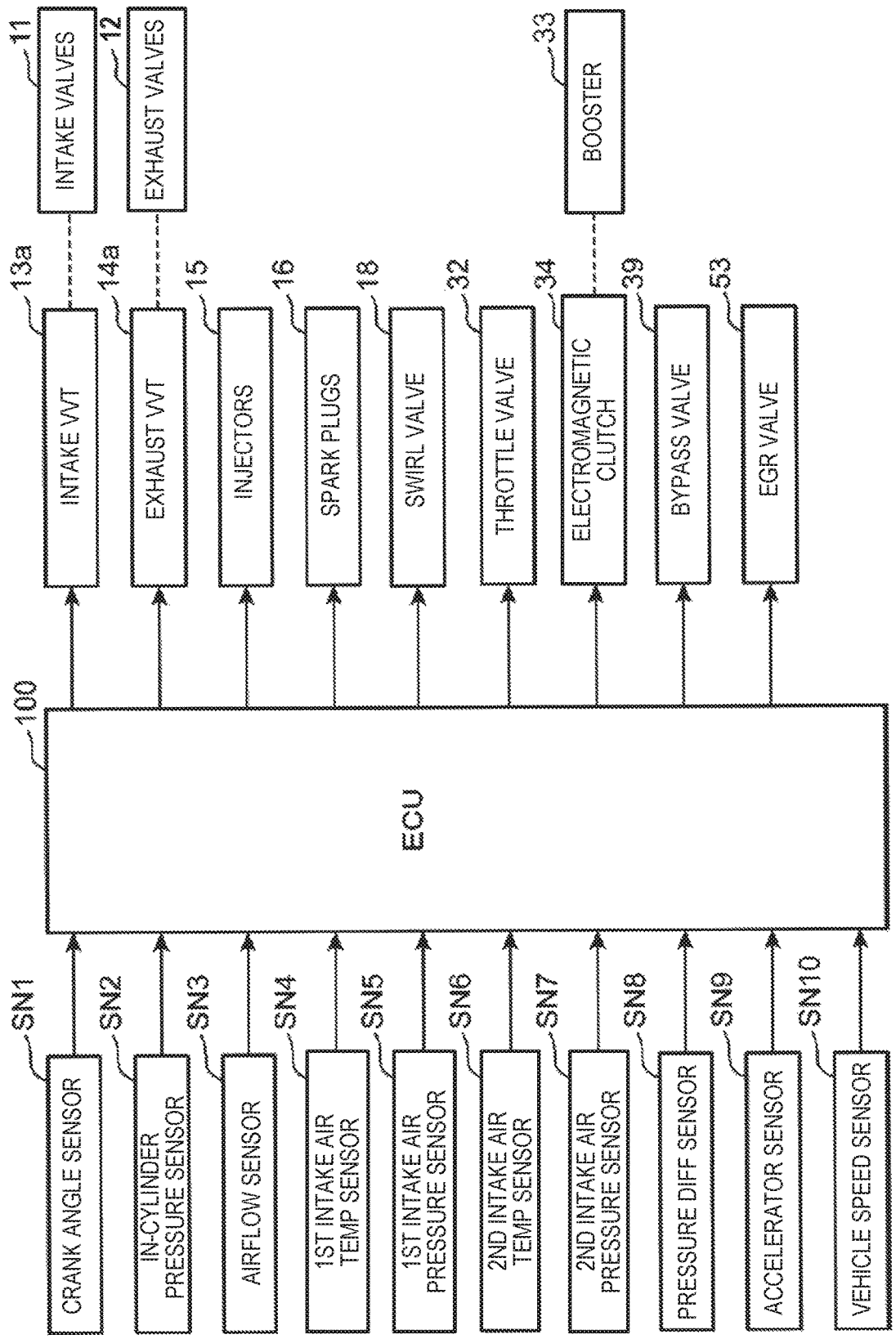
FIG. 4 is a block diagram illustrating a control system of the engine.

FIG. 4 is a block diagram illustrating a control system of the engine. An ECU (electronic control unit) 100 illustrated in FIG. 4 is a microprocessor which comprehensively controls the engine, and comprised of a well-known processor, ROM, RAM, etc.

The ECU 100 receives detection signals from various sensors. For example, the ECU 100 is electrically connected to the crank angle sensor SN1, the in-cylinder pressure sensor SN2, the airflow sensor SN3, the first and second intake air temperature sensors SN4 and SN6, the first and second intake air pressure sensors SN5 and SN7, and the pressure difference sensor SN8, which are described above. The ECU 100 sequentially receives the information detected by these sensors (i.e., the crank angle, the engine speed, the in-cylinder pressure, the intake air flow rate, the intake air temperatures, the intake air pressures, the difference in pressure between the upstream and downstream sides of the EGR valve 53, etc.).

Further, an accelerator sensor SN9 which detects an opening of an accelerator pedal controlled by a vehicle driver driving the vehicle and a vehicle speed sensor SN10 which detects a traveling speed of the vehicle (hereinafter, referred to as "the vehicle speed") are provided in the vehicle, and detection signals from the accelerator sensor SN9 and the vehicle speed sensor SN10 are also inputted to the ECU 100.

The ECU 100 controls various components of the engine while executing various determinations and calculations based on the input signals from the various sensors. That is, the ECU 100 is electrically connected to the intake VVT 13a, the exhaust VVT 14a, the injector 15, the spark plug 16, the swirl valve 18, the throttle valve 32, the electromagnetic clutch 34, the bypass valve 39, the EGR valve 53, etc., and outputs control signals to these components based on various calculation results.

Note that the ECU 100 as described above corresponds to "combustion controller."

(3) Control According to Operating State

Figure 5:
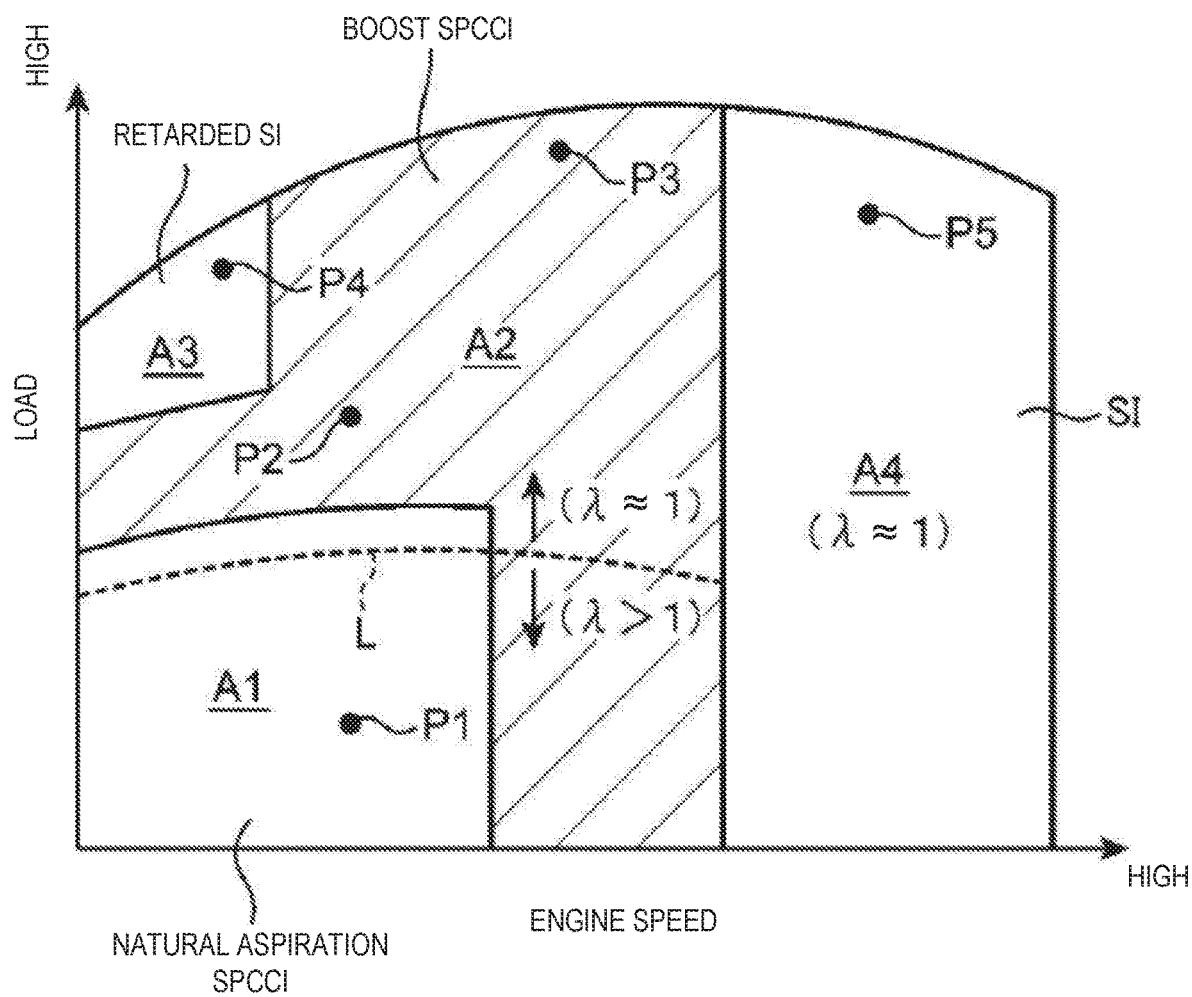
FIG. 5 is a map in which an operating range of the engine is divided by a difference in combustion modes.

FIG. 5 is a map illustrating a difference in control according to speed/load of the engine. As illustrated in FIG. 5, an operating range of the engine are roughly divided by a difference in combustion modes into four operating ranges, a first operating range A1, a second operating range A2, a third operating range A3, and a fourth operating range A4. The first operating range A1 is a low-speed low-load range in which the engine speed and load are both low. The third operating range A3 is a low-speed high-load range in which the engine speed is low and the load is high. The fourth operating range A4 is a high-speed range in which the engine speed is high. The second operating range A2 is a remaining range except for the first, third and fourth ranges A1, A3 and A4 (i.e., a range in which a low-speed medium-load range and a medium-speed range are combined). Hereinafter, the combustion mode, etc. selected in each operating range is sequentially described.

(a) First Operating Range

Within the first operating range A1 in which the engine speed is low and the engine load is low, the partial compression-ignition combustion combined the SI combustion and the CI combustion (hereinafter referred to as "SPCCI combustion") is performed. The SI combustion is a mode in which the mixture gas is ignited by the spark plug 16 and is then forcibly combusted by flame propagation which spreads the combusting region from the ignition point, and the CI combustion is a mode in which the mixture gas is combusted by self-ignition in an environment increased in temperature and pressure due to the compression of the piston 5. The SPCCI combustion combining the SI combustion and the CI combustion is a combustion mode in which the SI combustion is performed on a portion of the mixture gas inside the combustion chamber 6 by the spark-ignition performed in an environment immediately before the mixture gas self-ignites, and after the SI combustion, the CI combustion is performed on the remaining mixture gas in the combustion chamber 6 by self-ignition (by the further increase in temperature and pressure accompanying the SI combustion). Note that "SPCCI" is an abbreviation of "SPark Controlled Compression Ignition."

Figure 6:
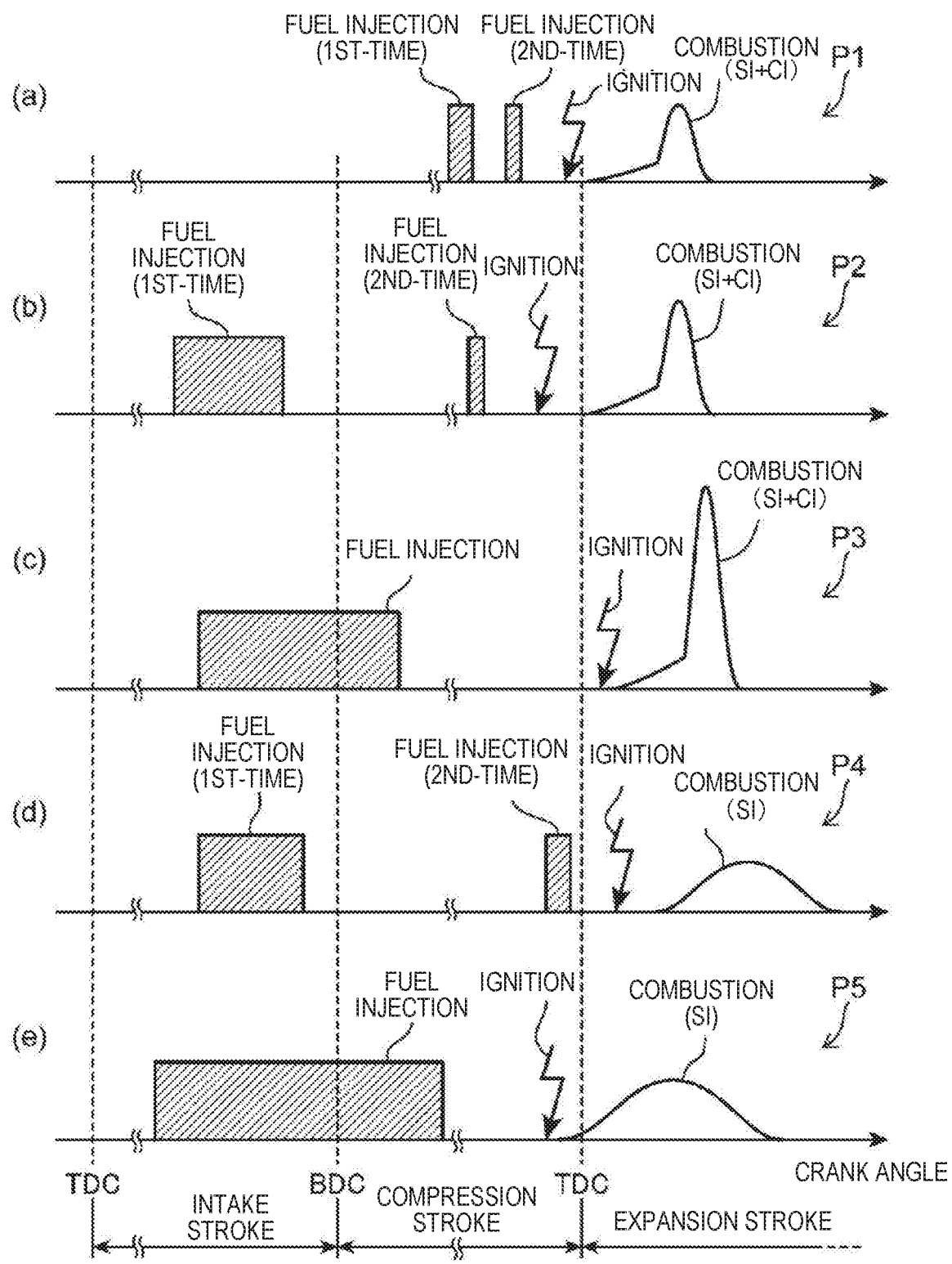
FIG. 6 shows time charts schematically illustrating a combustion control executed in respective operating ranges of the engine.
Figure 7:
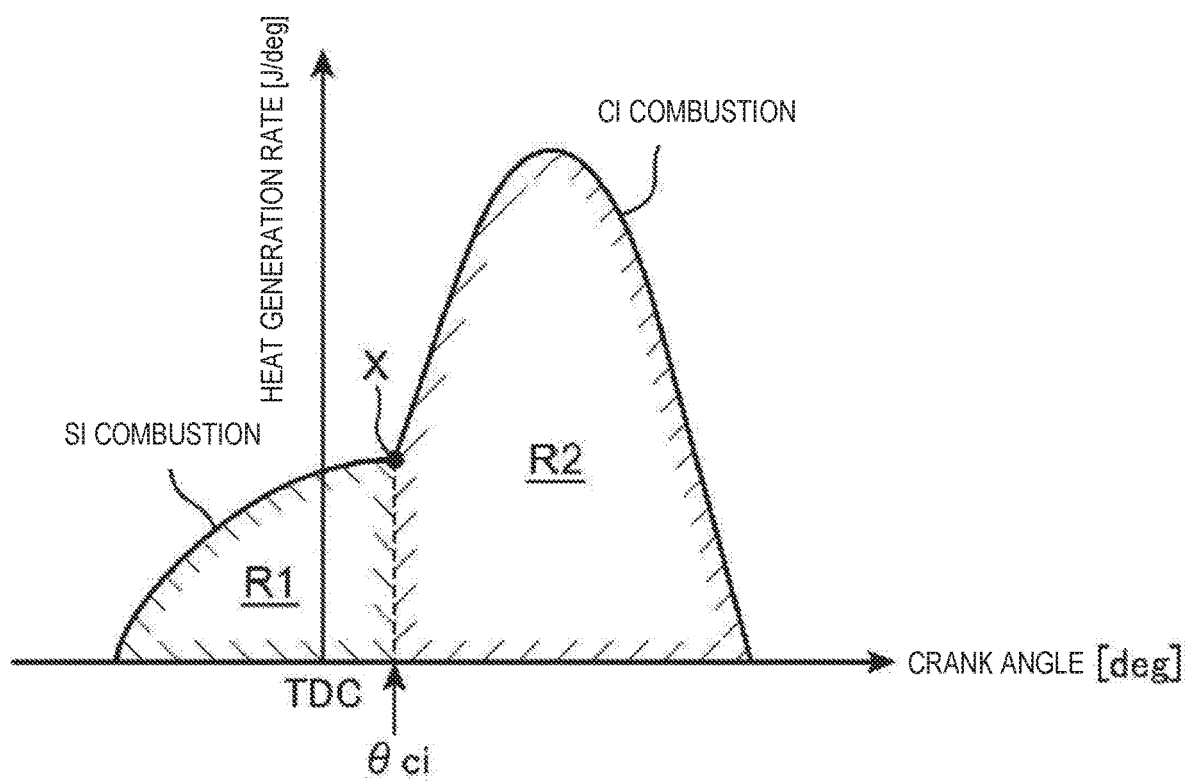
FIG. 7 is a chart illustrating a waveform of a heat generation rate in SPCCI combustion (partial compression-ignition combustion).

The SPCCI combustion has a characteristic that the heat generation in the CI combustion is faster than that in the SI combustion. For example, as illustrated in FIG. 6 or 7 described later, a waveform of a heat generation rate caused by the SPCCI combustion has a shape in which a rising slope in an early stage of the combustion which corresponds to the SI combustion is gentler than a rising slope caused corresponding to the CI combustion occurring subsequently. In other words, the waveform of the heat generation rate caused by the SPCCI combustion is formed to have a first heat generation rate portion formed by the SI combustion and having a relatively gentle rising slope, and a second heat generation rate portion formed by the CI combustion and having a relatively sharp rising slope, which are next to each other in this order. Further, corresponding to the tendency of such a heat generation rate, in the SPCCI combustion, a pressure increase rate (dp/dθ) inside the combustion chamber 6 caused by the SI combustion is lower than that in the CI combustion.

When the temperature and pressure inside the combustion chamber 6 rise due to the SI combustion, the unburned mixture gas self-ignites and the CI combustion starts. As illustrated in FIG. 6 or 7 described later, the slope of the waveform of the heat generation rate changes from gentle to sharp at the timing of self-ignition (that is, the timing when the CI combustion starts). That is, the waveform of the heat generation rate caused by the SPCCI combustion has a flection point at a timing when the CI combustion starts (labeled with an "X" in FIG. 7).

After the CI combustion starts, the SI combustion and the CI combustion are performed in parallel. In the CI combustion, since the combustion speed of the mixture gas is higher than that in the SI combustion, the heat generation rate becomes relatively high. However, since the CI combustion is performed after TDC of compression stroke (CTDC), the slope of the waveform of the heat generation rate does not become excessive. That is, after CTDC, since the motoring pressure decreases due to the piston 5 descending, the rise of the heat generation rate is prevented, which avoids excessive dp/dθ in the CI combustion. In the SPCCI combustion, due to the CI combustion being performed after the SI combustion as described above, it is unlikely for dp/dθ which is an index of combustion noise to become excessive, and the combustion noise is reduced compared to performing the CI combustion alone (in the case where the CI combustion is performed on all the fuel).

The SPCCI combustion ends as the CI combustion finishes. Since the combustion speed of the CI combustion is faster than that of the SI combustion, the combustion end timing is advanced compared to performing the SI combustion alone (in the case where the SI combustion is performed on all the fuel). In other words, the SPCCI combustion brings the combustion end timing closer to CTDC, on the expansion stroke. Thus, the SPCCI combustion improves the fuel efficiency compared to the SI combustion alone.

As specific modes of the SPCCI combustion, within the first operating range A1, a control for performing the SPCCI combustion of the mixture gas in a state where the boosting by the booster 33 is stopped (naturally aspirated state), is executed. In order to achieve such a SPCCI combustion under the naturally aspirated state, within the first operating range A1, the various components of the engine are controlled by the ECU 100 as follows.

The injector 15 injects all or majority of the fuel to be injected for one combustion cycle, during the compression stroke. For example, at an operation point P1 within the first operating range A1, the injector 15 injects the fuel separately in two times from an intermediate stage to a final stage of the compression stroke, as illustrated in the chart (a) of FIG. 6.

The spark plug 16 ignites the mixture gas near CTDC. For example, at the operation point P1, the spark plug 16 ignites the mixture gas at a slightly advanced timing from CTDC. This ignition triggers the SPCCI combustion, a portion of the mixture gas in the combustion chamber 6 is combusted through flame propagation (SI combustion), and then the rest of the mixture gas is combusted by self-ignition (CI combustion).

The booster 33 is controlled to be OFF. That is, the electromagnetic clutch 34 is disengaged to disconnect the booster 33 from the engine body 1 and the bypass valve 39 is fully opened so as to stop boosting by the booster 33.

The intake VVT 13a and the exhaust VVT 14a set valve operation timings of the intake and exhaust valves 11 and 12 so that internal EGR is performed, i.e., the valve overlap period in which both the intake and exhaust valves 11 and 12 are opened over TDC of the exhaust stroke is sufficiently formed. As a result, the internal EGR which leaves the burned gas inside the combustion chamber 6 is achieved, and the temperature of the combustion chamber 6 (the initial temperature before the compression) is increased.

The throttle valve 32 is fully opened.

An opening of the EGR valve 53 is controlled so that an air-fuel ratio (A/F), which is a mass ratio between air (fresh air) in the combustion chamber 6 and the fuel, becomes a given target air-fuel ratio. For example, the target air-fuel ratio in the first operating range A1 is set leaner ($\lambda>1$) than a stoichiometric air-fuel ratio on the lower load side of a load line L illustrated in FIG. 5, and set to or near the stoichiometric air-fuel ratio ($\lambda\approx1$) on the higher load side of the load line L. Note that $\lambda$ is an excess air ratio. $\lambda=1$ is established when the air-fuel ratio is the stoichiometric air-fuel ratio (14.7:1), and $\lambda>1$ is established when the air-fuel ratio is leaner than the stoichiometric air-fuel ratio. The EGR valve 53 adjusts an amount of the exhaust gas recirculated through the EGR passage 51 (external EGR gas) so that the amount of air (fresh air) corresponding to the target air-fuel ratio described above is introduced into the combustion chamber 6. In other words, the EGR valve 53 adjusts the flow rate in the EGR passage 51 so as to recirculate from the EGR passage 51 to the combustion chamber 6, an amount of gas obtained by subtracting the air amount corresponding to the target air-fuel ratio and the amount of burned gas left in the combustion chamber 6 due to the internal EGR from a total gas amount introduced into the combustion chamber 6 in the state where the throttle valve 32 is fully opened, as external EGR gas. Within the first operating range A1, the air-fuel ratio (A/F) is set to or leaner than the stoichiometric air-fuel ratio as described above, and also the EGR gas (external EGR gas and internal EGR gas) is introduced into the combustion chamber 6. Therefore, a gas-fuel ratio (G/F) which is a mass ratio of the total gas to the fuel in the combustion chamber 6 is lean over the entire first operating range A1.

An opening of the swirl valve 18 is in the fully closed state or narrowed to a small opening close to the fully closed state. As a result, all or majority of the intake air introduced into the combustion chamber 6 is from the first intake port 9A (the intake port on the side where the swirl valve 18 is not provided), thus a strong swirl flow is formed inside the combustion chamber 6. This swirl flow grows during the intake stroke and remains until the middle of the compression stroke. Therefore, for example, when the fuel is injected after an intermediate stage of the compression stroke as at the operation point P1 described above, stratification of the fuel is achieved by the effect of the swirl flow. That is, when the fuel is injected after the intermediate stage of the compression stroke in the presence of the swirl flow, the injected fuel is collected in a center portion of the combustion chamber 6 where the swirl flow is relatively weak. Thus, such concentration difference that the fuel in the center portion of the combustion chamber 6 concentrates more than outside thereof (outer circumferential portion) occurs, and the stratification of the fuel is achieved. For example, the air-fuel ratio in the center portion of the combustion chamber 6 is set to between 20:1 and 30:1 and the air-fuel ratio in an outer circumference portion of the combustion chamber 6 is set to 35:1 or above.

(b) Second Operating Range

Within the second operating range A2 (the combined range of the low-speed medium-load range and the medium-speed range), the control for performing the SPCCI combustion of the mixture gas while the booster 33 performs the boosting is executed. For example, in order to achieve the SPCCI combustion accompanying the boosting, within the second operating range A2, various components of the engine are controlled by the ECU 100 as follows.

The injector 15 injects a portion of the fuel to be injected in one combustion cycle during the intake stroke, and injects the rest of the fuel on the compression stroke. For example, as illustrated in the chart (b) of FIG. 6, at an operation point P2 within the second operating range A2, the injector 15 performs a first (first-time) fuel injection by which a relatively large amount of fuel is injected during the intake stroke and performs a second (second-time) fuel injection by which a smaller amount of fuel than the first fuel injection is injected during the compression stroke. Further, as illustrated in the chart (c) of FIG. 6, at an operation point P3 which is on the higher load and higher speed side of the operation point P2, the injector 15 performs a fuel injection over a series of period from the intake stroke to the compression stroke.

The spark plug 16 ignites the mixture gas near CTDC. For example, the spark plug 16 ignites the mixture gas at a slightly advanced timing from CTDC at the operation point P2 (the chart (b) of FIG. 6) and ignites the mixture gas at a slightly retarded timing from CTDC at the operation point P3 (the chart (c) of FIG. 6). This ignition triggers the SPCCI combustion, a portion of the mixture gas inside the combustion chamber 6 is combusted through flame propagation (SI combustion), and then the rest of the mixture gas is combusted by self-ignition (CI combustion).

The booster 33 is turned on. That is, the electromagnetic clutch 34 is engaged to connect the booster 33 to the engine body 1 so as to perform the boosting by the booster 33. Here, the opening of the bypass valve 39 is controlled so that the pressure in the surge tank 36 (boosting pressure) detected by the second intake air pressure sensor SN7 matches a given target pressure determined in advance for each operating condition (engine speed and engine load). For example, as the opening of the bypass valve 39 increases, the flow rate of the intake air which flows back to the upstream side of the booster 33 through the bypass passage 38 increases, and as a result, the pressure of the intake air introduced into the surge tank 36, i.e., the boosting pressure, becomes low. By adjusting the backflow amount of the intake air in this manner, the bypass valve 39 controls the boosting pressure to the target pressure.

The intake VVT 13a and the exhaust VVT 14a set valve operation timings of the intake and exhaust valves 11 and 12 so that the internal EGR is performable only in a portion of the second operating range A2 on the lower load side (i.e., so that the internal EGR is stopped on the higher load side).

The throttle valve 32 is fully opened.

The opening of the EGR valve 53 is controlled so that the air-fuel ratio (A/F) in the combustion chamber 6 becomes the target air-fuel ratio. For example, the target air-fuel ratio in the second operating range A2 is set to lean ($\lambda>1$) on the lower load side of the load line L (FIG. 5), and set to or near the stoichiometric air-fuel ratio ($\lambda\approx1$) on the higher load side of the load line L. The EGR valve 53 adjusts the amount of the external gas recirculated through the EGR passage 51

(external EGR gas) so that the air (fresh air) amount corresponding to the target air-fuel ratio is introduced into the combustion chamber 6. For example, the recirculation amount of the exhaust gas is adjusted to be smaller as approaching the higher load side, and adjusted to approximately zero near the highest load of the engine. In other words, the gas-fuel ratio (G/F) inside the combustion chamber 6 is set lean except for near the highest load of the engine.

The opening of the swirl valve 18 is in the fully closed state or opened to a suitable medium opening except for the full open state. For example, the opening of the swirl valve 18 is in the fully closed state in the low load side portion of the second operating range A2 and in the medium opening in the remaining high load side. Note that the medium opening of the swirl valve 18 increases as the load increases.

(c) Third Operating Range

Within the third operating range A3 on the low-speed, high-load side, a control is executed in which at least a portion of the fuel is injected in the final stage of the compression stroke and the mixture gas is subjected to the SI combustion. For example, in order to achieve the SI combustion accompanied by such a retarded injection, within the third operating range A3, the various components of the engine are controlled by the ECU 100 as follows.

The injector 15 injects a portion of the fuel to be injected in one combustion cycle during the intake stroke, and injects the rest of the fuel in a final stage of the compression stroke. For example, as illustrated in the chart (d) of FIG. 6, at an operation point P4 within the third operating range A3, the injector 15 performs the first fuel injection in which a relatively large amount of fuel is injected during the intake stroke and performs the second fuel injection in which a smaller amount of fuel than the first fuel injection is injected in the final stage of the compression stroke (immediately before CTDC).

The spark plug 16 ignites the mixture gas at a relatively retarded timing, for example 5° CA to 20° CA from CTDC. Further, this ignition triggers the SI combustion, and all of the mixture gas in the combustion chamber 6 combusts through flame propagation. Note that the reason why the ignition timing within the third operating range A3 is retarded as described above is to prevent abnormal combustion, such as knocking and pre-ignition. However, within the third operating range A3, the second fuel injection is set to be performed in the final stage of the compression stroke (immediately before CTDC), which is considerably late, therefore, even with the ignition timing retarded as described above, the combustion speed after the ignition (flame propagation speed) is relatively fast. That is, since the period from the second fuel injection to the ignition is sufficiently short, the flow (turbulence kinetic energy) in the combustion chamber 6 at the ignition timing becomes relatively strong, and the combustion speed after the ignition is accelerated using this flow. Thus, thermal efficiency is kept high while preventing the abnormal combustion.

The booster 33 is controlled to be ON. That is, the electromagnetic clutch 34 is engaged to connect the booster 33 to the engine body 1 so as to perform the boosting by the booster 33. Here, the opening of the bypass valve 39 is controlled so that the pressure inside the surge tank 36 (the boosting pressure) matches the target pressure.

The throttle valve 32 is fully opened.

The opening of the EGR valve 53 is controlled so that the air-fuel ratio (A/F) in the combustion chamber 6 becomes the stoichiometric air-fuel ratio or slightly richer than the stoichiometric air-fuel ratio. On the other hand, the gas-fuel ratio (G/F) inside the combustion chamber 6 is set lean except for near the highest load of the engine.

The opening of the swirl valve 18 is set to or near a given intermediate opening (e.g., 50%).

(d) Fourth Operating Range

Within a fourth operating range A4 on the higher speed side of the first to third ranges A1 to A3, relatively basic SI combustion is executed. In order to achieve this SI combustion, within the fourth operating range A4, the various components of the engine are controlled by the ECU 100 as follows.

The injector 15 at least injects the fuel over a given period overlapping with the intake stroke. For example, at an operation point P5 within the fourth operating range A4, the injector 15 injects the fuel over a continuous period from the intake stroke to the compression stroke, as illustrated in the chart (e) of FIG. 6. Note that at the operation point P5, since it corresponds to a considerably high-speed and high-load condition, the amount of fuel to be injected in one combustion cycle is large and also a crank angle period required for injecting the required amount of fuel becomes long, for which the fuel injection period at the operation point P5 is longer than the other operation points (P1 to P4) described above.

The spark plug 16 ignites the mixture gas near CTDC. For example, at the operation point P5, the spark plug 16 ignites the mixture gas at a slightly advanced timing from CTDC. Further, this ignition triggers the SI combustion, and all the mixture gas in the combustion chamber 6 combusts through flame propagation.

The booster 33 is controlled to be ON and performs boosting. The boosting pressure here is adjusted by the bypass valve 39.

The throttle valve 32 is fully opened.

The opening of the EGR valve 53 is controlled so that the air-fuel ratio (A/F) in the combustion chamber 6 becomes the stoichiometric air-fuel ratio or slightly richer. On the other hand, the gas-fuel ratio (G/F) inside the combustion chamber 6 is set lean except for near the highest load of the engine.

The swirl valve 18 is fully opened. Thus, not only the first intake port 9A but also the second intake port 9B are fully opened and charging efficiency of the engine is improved.

(4) About SI Ratio

As described above, in this embodiment, the SPCCI combustion combined the SI combustion and the CI combustion is performed within the first and second operating ranges A1 and A2. In this SPCCI combustion, it is important to control the ratio of the SI combustion with the CI combustion according to the operating condition.

In this embodiment, as this ratio, an SI ratio which is a ratio of a heat generation amount by the SI combustion to the total heat generation amount by the SPCCI combustion (the SI combustion and the CI combustion) is used. FIG. 7 is a chart illustrating this SI ratio and illustrating a change in the heat generation rate (J/deg) according to the crank angle when the SPCCI combustion occurs. The flection point X in the waveform of FIG. 7 is a flection point appearing when the combustion mode switches from the SI combustion to the CI combustion and the crank angle θci corresponding to this flection point X may be defined as the start timing of CI combustion. Further, an area R1 of the waveform of the heat generation rate located on the advance side of this θci (the start timing of CI combustion) is set as the heat generation amount by the SI combustion, and an area R2 of the waveform of the heat generation rate located on the retarding side of θci is set as the heat generation rate by the CI combustion. Thus, the SI ratio defined by (heat generation amount by SI combustion)/(heat generation amount by SPCCI combustion) may be expressed by R1/(R1+R2) using the respective areas R1 and R2. That is, in this embodiment, the SI ratio=R1/(R1+R2).

The SI ratio is in correlation with a combustion center of gravity which is a timing when a half of the total mass (50% mass) of the fuel injected into the combustion chamber 6 in one combustion cycle combusts. For example, since a ratio of the CI combustion at which the mixture gas combusts at a plurality of positions simultaneously increases as the SI ratio decreases, an average combustion speed increases, and the combustion center of gravity advances to approach CTDC. This leads to improving the thermal efficiency but also leads to increasing combustion noise. On the contrary, since the average combustion speed decreases as the SI ratio increases (as the ratio of the CI combustion decreases), the combustion center of gravity retards to move away from CTDC. This leads to reducing combustion noise but also leads to degrading the thermal efficiency. In this embodiment, in consideration of such a correlation between the SI ratio and the combustion center of gravity, an optimal combustion center of gravity at which high thermal efficiency is obtained while having combustion noise at an allowable level or lower is determined as a target combustion center of gravity in advance and an optimal SI ratio corresponding to the target combustion center of gravity is determined as a target SI ratio in advance.

Here, the target combustion center of gravity changes according to the operating condition (speed/load) of the engine. For example, in a high engine load condition in which the heat generation amount is large, since the fuel injection amount is large and a total amount of heat generation within the combustion chamber 6 is large (i.e., combustion noise easily increases), compared to in a low engine load condition in which the heat generation amount is small, the combustion center of gravity needs to be greatly retarded from CTDC in order to reduce combustion noise. On the contrary, in the low engine load condition, compared to in the high engine load condition, the heat generation amount is small and combustion noise does not easily increase. Therefore, it is desirable to set the combustion center of gravity to the advancing side in order to improve thermal efficiency. For this reason, the target combustion center of gravity is comprehensively set further on the retarding side as the engine load is higher (i.e., further on the advancing side as the engine load is lower). Further, since the progression amount of crank angle per unit time changes according to the engine speed, the optimal combustion center of gravity taking the noise and thermal efficiency into consideration also changes according to the engine speed. Therefore, the target combustion center of gravity is set variably also in accordance with the engine speed in addition to the engine load.

As described above, since the target combustion center of gravity in the SPCCI combustion changes according to the engine speed and engine load, the target SI ratio is also set variably according to the engine speed and engine load. For example, since the target combustion center of gravity is set further on the retarding side as the engine load is higher as described above, the target SI ratio is set higher as the engine load is higher (i.e., the ratio of the CI combustion decreases as the engine load increases).

Moreover, in this embodiment, target values of control amounts, such as the ignition timing of the spark plug 16, the fuel injection amount/timing, and in-cylinder state functions, are determined in advance according to the respective operating conditions (engine speed/load) so that the target combustion center of gravity and the target SI ratio which are set as described above are achieved. Note that the in-cylinder state functions referred to here include, for example, the temperature in the combustion chamber 6 and an EGR ratio. The EGR ratio includes an external EGR ratio which is a ratio of the external EGR gas (exhaust gas recirculated to the combustion chamber 6 through the EGR passage 51) to all the gas in the combustion chamber 6, and an internal EGR ratio which is a ratio of the internal EGR gas (burned gas remaining in the combustion chamber 6) to all the gas in the combustion chamber 6.

For example, as the ignition timing (the timing of spark-ignition) of the spark plug 16 is advanced, a larger amount of fuel is combusted in the SI combustion, and the SI ratio increases. Further, as the injection timing of the fuel is advanced, a larger amount of fuel is combusted in the CI combustion, and the SI ratio decreases. Alternatively, as the temperature of the combustion chamber 6 rises, a larger amount of fuel is combusted in the CI combustion, and the SI ratio decreases. Moreover, since a change in the SI ratio is followed by a change in the combustion center of gravity, changes in these control amounts (the ignition timing, the injection timing, the in-cylinder temperature, etc.) are factors for adjusting the combustion center of gravity.

Based on such a tendency, in this embodiment, the target values of the ignition timing, the fuel injection amount and timing, and the in-cylinder state functions (temperature, EGR ratio, etc.) are determined in advance for each operating condition so as to achieve a combination of values achievable of the target combustion center of gravity and the target SI ratio described above. In the operation with the SPCCI combustion (i.e., in the operation within the first and second operating ranges A1 and A2), the ECU 100 controls the injector 15, the spark plug 16, the EGR valve 53, the intake and exhaust VVTs 13a and 14a, etc. based on the target values of these control amounts. For example, the spark plug 16 is controlled based on the target value of the ignition timing and the injector 15 is controlled based on the target values of the fuel injection amount and timing. Further, the EGR valve 53 and the intake and exhaust VVTs 13a and 14a are controlled based on the respective target values of the temperature of the combustion chamber 6 and the EGR ratio, and the recirculation amount of exhaust gas (external EGR gas) through the EGR passage 51 and the residual amount of burned gas (internal EGR gas) by the internal EGR are adjusted.

Note that in this embodiment in which the target combustion center of gravity and the target SI ratio are determined in advance for each operating condition of the engine, the start timing θci of the CI combustion when the combustion conforming to the target combustion center of gravity and the target SI ratio is performed is also necessarily determined in advance. In the following description, the start timing of CI combustion determined based on the target combustion center of gravity and the target SI ratio is referred to as standard θci. This standard θci serves as a reference for determining a target θci in a flowchart (S4 in FIG. 8) described later.

(5) Control in SPCCI Combustion According to Combustion Noise Index Value

In the SPCCI combustion combined the SI combustion and the CI combustion, knocking may occur due to the respective SI combustion and CI combustion, and these respective knockings become the cause of increase in the combustion noise. When knocking caused by the SI combustion is SI knock and knocking caused by the CI combustion is CI knock, the SI knock means a phenomenon in which the unburned gas outside the area where the SI combustion of the mixture gas occurs combusts rapidly by abnormal, local self-ignition (local self-ignition which is clearly different from normal CI combustion), and the CI knock is a phenomenon in which main components of the engine (cylinder block/head, piston, crank journal part, etc.) resonate due to a pressure fluctuation by the CI combustion. The SI knock occurs as loud noise at a frequency of approximately 6.3 kHz due to vibration of air column inside the combustion chamber 6 occurring by the local self-ignition. On the other hand, the CI knock occurs as loud noise at a frequency within a range of approximately 1 to 4 kHz (more specifically, a plurality of frequencies included in this range) due to the resonance of the main components of the engine. Thus, the SI knock and the CI knock occur as noises at different frequencies caused by different reasons, and the frequency of the noise in the CI knock is lower than the frequency of the noise in the SI knock.

Since such SI knock and CI knock are both perceived as harsh noise to person(s) in a cabin, the SPCCI combustion is controlled so that the SI knock and the CI knock are both reduced. However, according to the present inventors' knowledge, it is known that controlling the SPCCI combustion to have the noise, caused by the CI knock lower than its allowable level, necessarily brings the noise caused by the SI knock lower than its allowable level as well. Therefore, in this embodiment, the level of noise caused by the CI knock (noise of a frequency of approximately 1 to 4 kHz) is detected as a combustion noise index value, and the SPCCI combustion is controlled based on this combustion noise index value. As will be described later in detail, the combustion noise index value is calculated by performing a Fourier transform on a detected waveform by the in-cylinder pressure sensor SN2.

Figure 8:
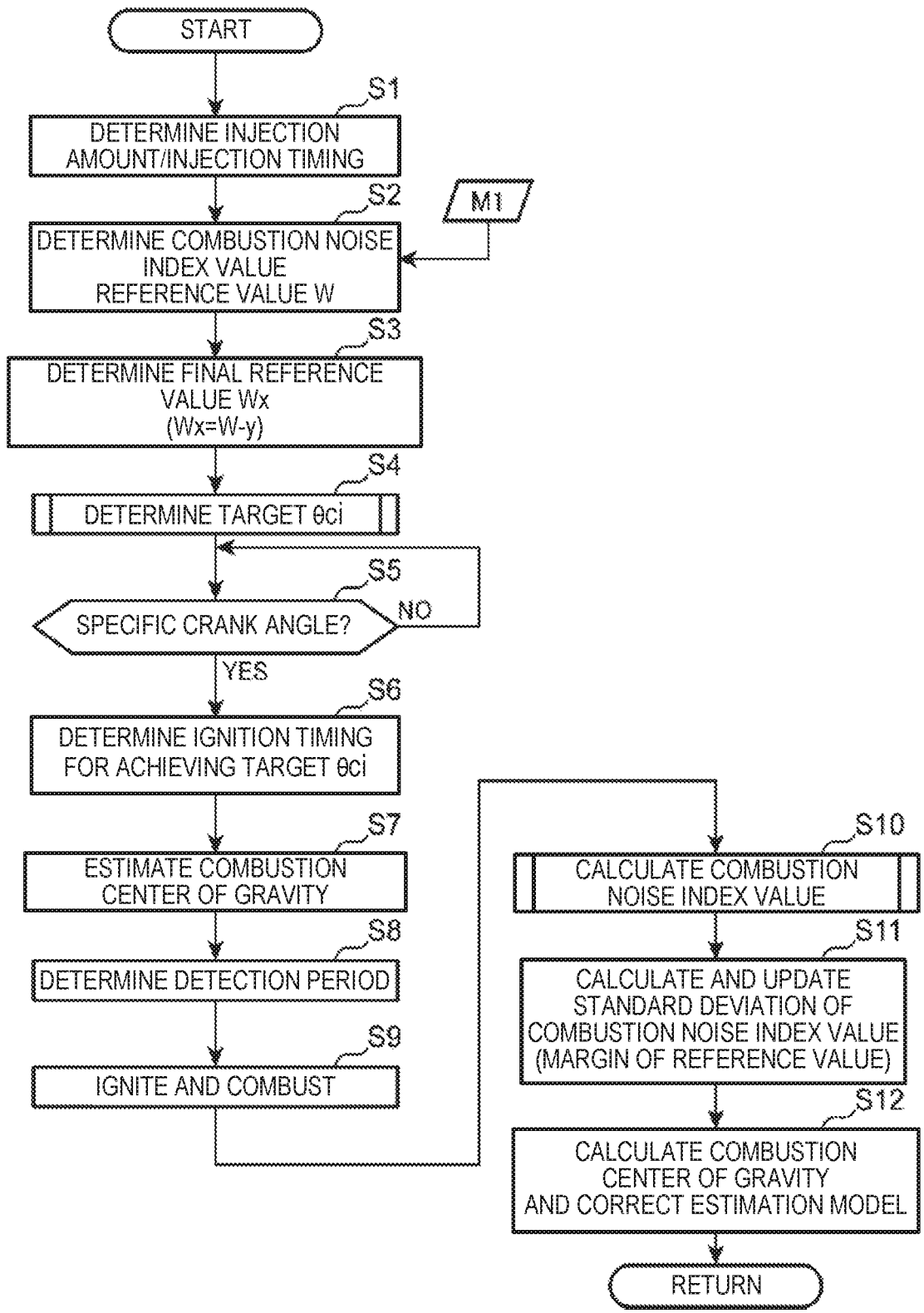
FIG. 8 is a flowchart illustrating details of a control executed in the SPCCI combustion.

FIG. 8 is a flowchart illustrating a specific procedure of the control executed by the ECU 100 in the SPCCI combustion, that is, in the operation within the first and second operating ranges A1 and A2 illustrated in FIG. 5. When the control illustrated in this flowchart starts, at S1, the ECU 100 determines the fuel injection amount from the injector 15 and its injection timing based on the engine speed detected by the crank angle sensor SN1 and the engine load which is specified by the detection value of the accelerator sensor SN9 (accelerator opening), the detection value of the airflow sensor SN3 (intake flow rate), etc. Note that as described in Section (4) above, in this embodiment, the target combustion center of gravity and the target SI ratio are determined in advance for each operating condition of the engine, and the fuel injection amount and timing for achieving the target combustion center of gravity and the target SI ratio are determined in advance for each operating condition of the engine. The fuel injection amount and timing determined at S1 is the injection amount and timing for achieving the target combustion center of gravity and the target SI ratio.

Figure 11:
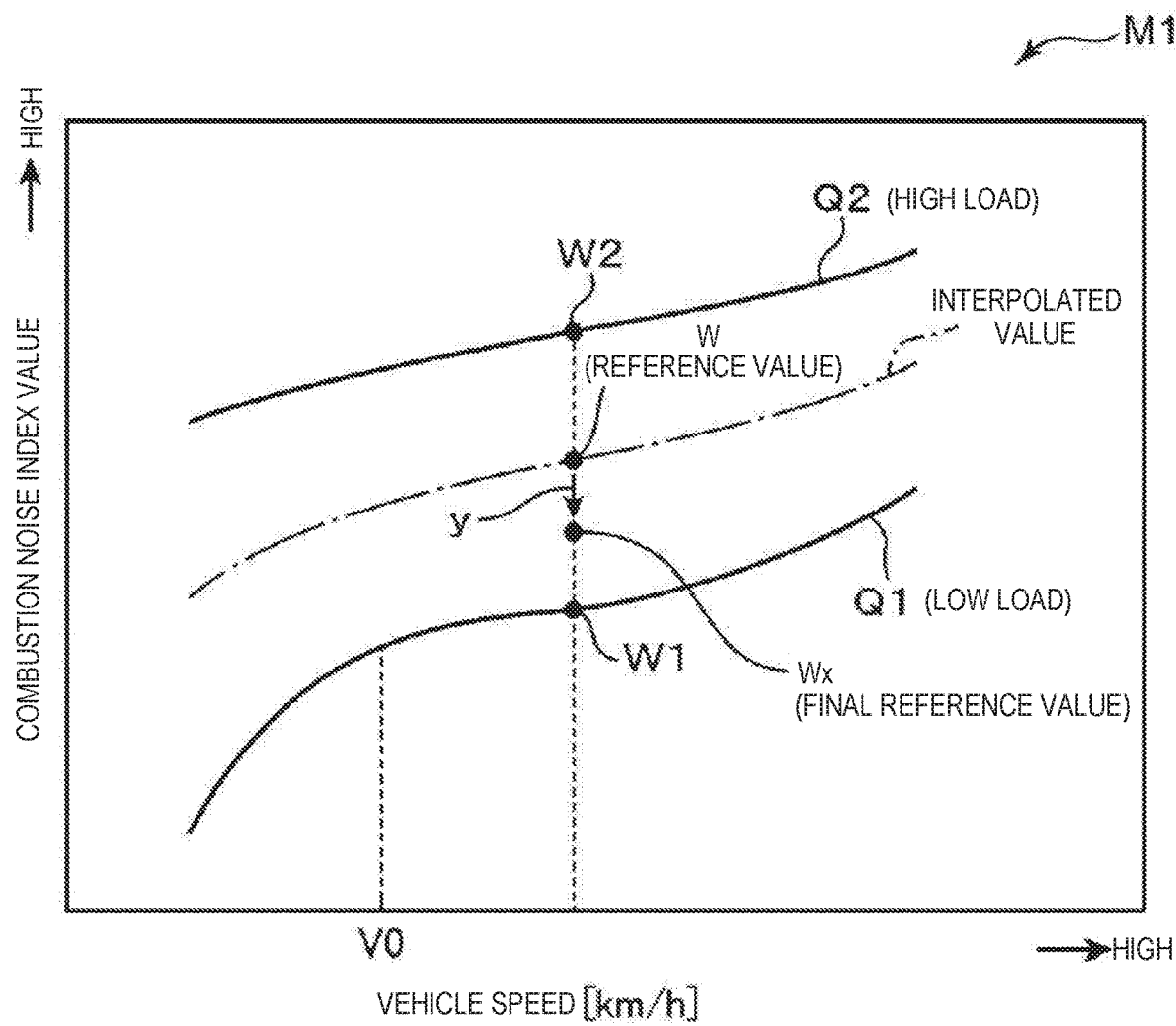
FIG. 11 is a map for determining a reference value of a combustion noise index value.

Next, the ECU 100 shifts to S2 to determine a reference value W which is an upper limit of the combustion noise index value allowable under the current operating condition (FIG. 11).

Specifically, at S2, the ECU 100 specifies the reference value W of the combustion noise index value based on the engine load specified based on the detection value of the accelerator sensor SN9 (accelerator opening), etc., the vehicle speed detected by the vehicle speed sensor SN10, and a map M1 illustrated in FIG. 11.

The map M1 of FIG. 11 is a map in which the reference value of the combustion noise index value is defined for each vehicle speed/engine load and stored in the ECU 100 in advance. The map M1 includes a first characteristic Q1 defining a reference value W1 when the vehicle speed is changed while the engine load is fixed to a given low load (e.g., a close value to the load corresponding to the operation point P1 illustrated in FIG. 5), and a second characteristic Q2 defining a reference value W2 when the vehicle speed is changed while fixing the engine load to a given high load (e.g., a close value to the load corresponding to the operation point P3 illustrated in FIG. 5). The reference value W2 defined by the second characteristic Q2 for high load is set to be larger than the reference value W1 defined by the first characteristic Q1 for low load. Further, both the first characteristic Q1 and the second characteristic Q2 have a tendency in which the reference values W1 and W2 respectively rise as the vehicle speed increases. Note that while the second characteristic Q2 for high load has a substantially proportional characteristic in which a change rate (the slope of a waveform) of the reference value W2 with respect to the vehicle speed is approximately the same at any vehicle speed, the first characteristic Q1 for low load has a non-linear characteristic in which a change rate of the reference value W1 within a vehicle speed range below a given value V0 (low vehicle speed range) is higher than that within a range including the given value V0 and higher (high vehicle speed range).

At S2, the ECU 100 identifies the reference value W of the combustion noise index value corresponding to the current operating condition by comparing the current vehicle speed and the engine load (current operating condition) identified based on the detection values of the sensors SN9 and SN10, etc. to the map M1 of FIG. 11. For example, the ECU 100 identifies the reference value W1 corresponding to the current vehicle speed based on a value on the first characteristic Q1 for low load, identifies the reference value W2 corresponding to the current vehicle speed based on a value on the second characteristic Q2 for high load, and identifies the reference value W corresponding to the current operation condition by linear interpolation using the two reference values W1 and W2. For example, when the current engine load is an intermediate value between the load corresponding to the first characteristic Q1 and the load corresponding to the second characteristic Q2, an intermediate value between the reference value W1 and the reference value W2 is identified as the reference value W corresponding to the current operating condition. Further, when the current engine load is lower than the load corresponding to the first characteristic Q1 (or higher than the load corresponding to the second characteristic Q2, a value lower than the reference value W1 (higher than the reference value W2) is identified as the reference value W corresponding to the current operating condition. Note that it is needless to say that when the current engine load matches with the load corresponding to the first characteristic Q1 (or the second characteristic Q2), the reference value W1 (or W2) is identified as it is as the reference value W corresponding to the current operation condition.

According to the characteristics Q1 and Q2 described above, the reference value W is set larger as the vehicle speed/engine load increases. That is, the reference value W is a value which becomes larger when either one of the vehicle speed and engine load increases, becomes the smallest when both of the vehicle speed and engine load are low, and becomes the largest when both of the vehicle speed and engine load are high. This is because even if the combustion sound is small, it is perceived more easily as the vehicle speed and load are lower (conversely, even if the combustion sound is large, it is difficult to be perceived when the vehicle speed and load are high).

Next, the ECU 100 shifts to S3 to determine as the final reference value Wx of the combustion noise index value, a value obtained by subtracting from the reference value W of the combustion noise index value corresponding to the current operating condition specified at S2, a margin y which is based on a variation of the combustion noise index value acquired previously. Note that the margin y which is subtracted from the reference value W in the above processing is obtained from a history of the combustion noise index value acquired previously (S11 described later), and corresponds to a standard deviation of combustion noise index values accumulated in the past over a given period. The final reference value Wx is determined in consideration of the variation (standard deviation) in the combustion noise index value as described above because, if the same reference value is selected in disregard of the variation in noise in each combustion cycle, a possibility that the combustion accompanied by loud noise exceeding the reference value incidentally occurs becomes high. In other words, the final reference value Wx is set in consideration of the variation (standard deviation) in the above manner so as to ensure that combustion accompanied by loud noise exceeding the reference value does not occur in any combustion cycle regardless of the degree of the variation in the noise.

Next, the ECU 100 shifts to S4 to determine the target θci which is a target start timing of the CI combustion. This target θci is a target value of the crank angle (the crank angle θci illustrated in FIG. 7) at which the SI combustion is switched to the CI combustion, and is determined so as to make the combustion noise index value below the final reference value Wx.

Figure 9:
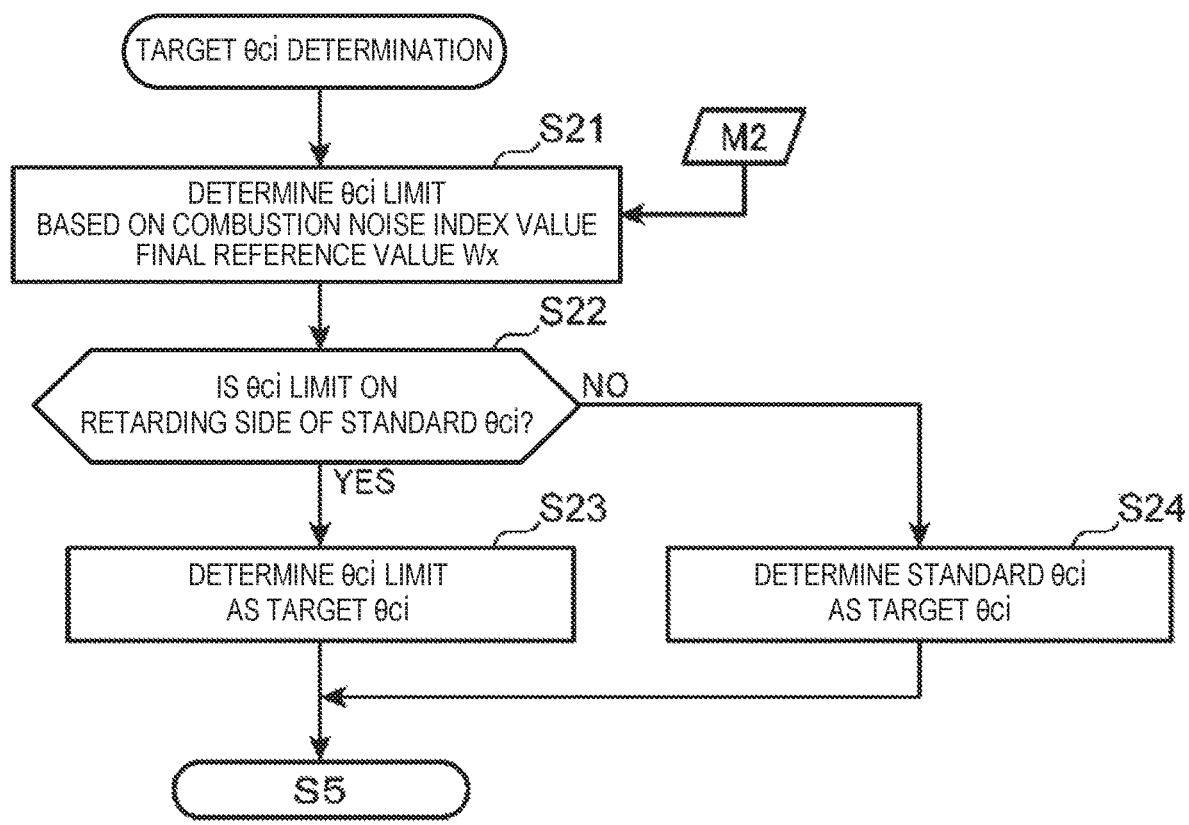
FIG. 9 is a subroutine illustrating details of the control at S4 of FIG. 8.

FIG. 9 is a subroutine illustrating details of a control at S4 where the target θci is determined. Once the control in this subroutine is started, at S21, the ECU 100 determines a θci limit which is a limit of the start timing of the CI combustion by which the noise index value is made equal to or lower than the final reference value Wx, based on the engine speed detected by the crank angle sensor SN1, the engine load specified based on the detection value of the accelerator sensor SN9, etc., the final reference value Wx of the combustion noise index value determined at S3, and a map M2 illustrated in FIG. 12.

Figure 12:
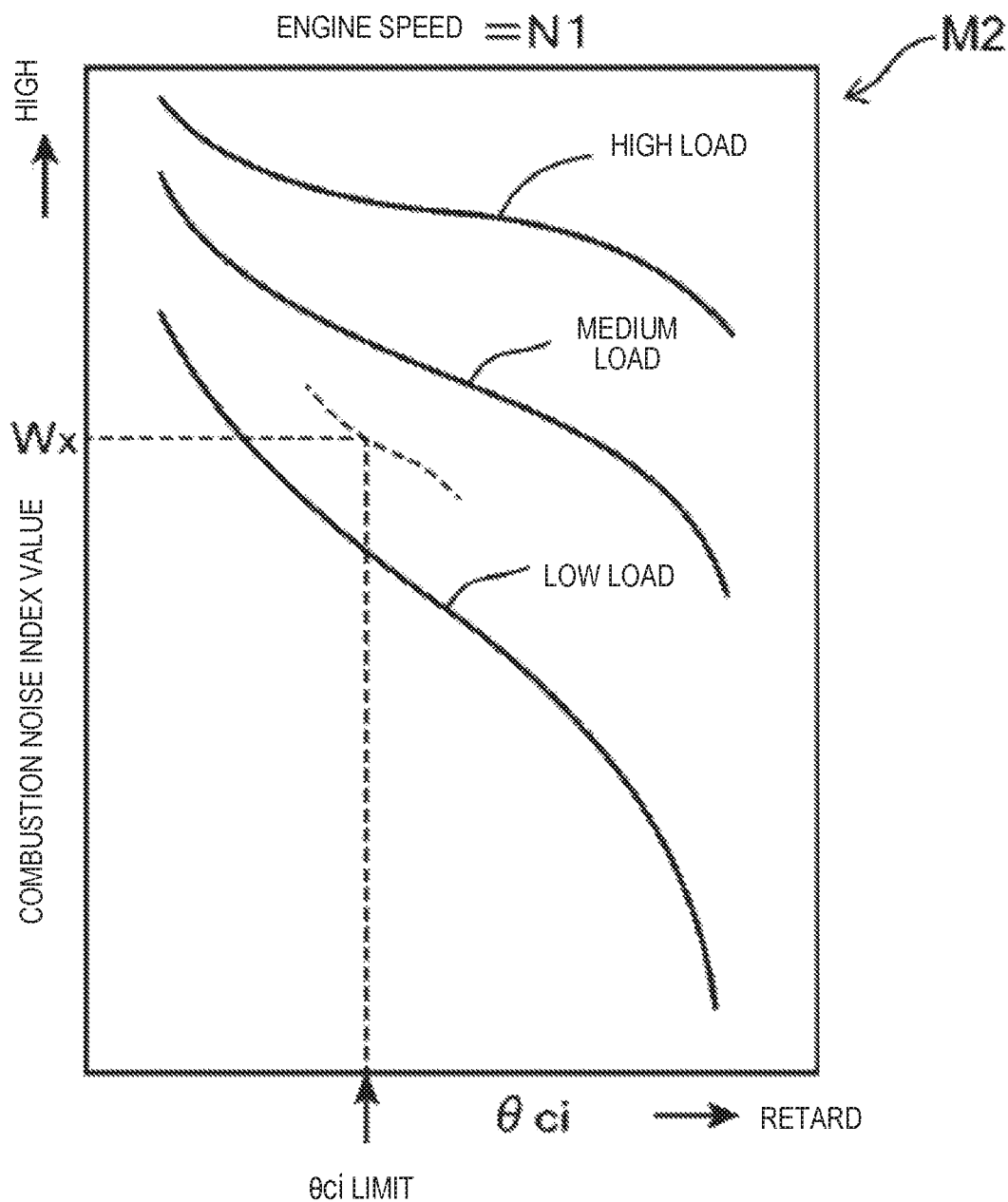
FIG. 12 is a map defining a relationship between a start timing ($\theta ci$) of CI combustion and the combustion noise index value.

The map M2 of FIG. 12 is a map defining a standard relationship between θci (the start timing of the CI combustion) and the combustion noise index value, and is stored in the ECU 100 in advance. More specifically, the map M2 defines a standard characteristic of the combustion noise index value obtained when the engine load is variously changed while keeping the engine speed (N1), and the horizontal axis indicates θci and the vertical axis indicates the combustion noise index value (estimated value). Note that although in FIG. 12, only three types of loads, the low load, the medium load, and the high load are illustrated for the sake of convenience, the characteristics other than the three types of loads are also included in the map M2. Moreover, although the engine speed is fixed (N1) in the map M2, maps created for other various engine speeds are also stored in the ECU 100 same as the map M2. When the engine speed/load is not specified in the map M2, the combustion noise index value may be estimated by, for example, linear interpolation. As described above, in this embodiment, when θci is changed under various conditions with different engine speeds/loads, how the combustion noise index value changes accordingly is estimated using the map M2 of FIG. 12.

At S21, the ECU 100 compares the final reference value Wx of the combustion noise index value determined at S3 with the map M2 in FIG. 12 to specify θci so that the combustion noise index value matches with the final reference value Wx, and this θci is determined as the θci limit described above.

Next, the ECU 100 shifts to S22 to determine whether the θci limit determined at S21 is on the retarding side of a given standard θci. Note that the standard θci used here is, as described in Section (4) above, the start timing of the CI combustion obtained when the combustion with the target combustion center of gravity and the target SI ratio determined for each operating condition of the engine (in other words, targeted SPCCI combustion) is achieved.

If S22 is YES and it is confirmed that the θci limit is on the retarding side of the standard θci, the ECU 100 shifts to S23 to determine the θci limit as the target θci.

On the other hand, if S22 is NO and it is confirmed that the θci limit is not on the retarding side of the standard θci, in other words, the θci limit is the same as or on the advancing side of the standard θci, the ECU 100 shifts to S24 to determine the standard θci as the target θci.

Once the determination process of the target θci is thus completed, the ECU 100 shifts to S5 of FIG. 8 to determine whether the crank angle is at a specific angle based on the detection value of the crank angle sensor SN1. This specific crank angle is determined in advance as the timing for determining the ignition timing by the spark plug 16, for example, about 60° CA before CTDC.

If S5 is YES and the crank angle is confirmed to be at the specific angle, the ECU 100 shifts to S6 to determine an ignition timing for achieving the target θci determined at S4. Here, in this embodiment, for each operating condition of the engine, the target values of the target combustion center of gravity, the target SI ratio, the standard θci corresponding to the target combustion center of gravity and the target SI ratio, the ignition timing for achieving the standard θci, the fuel injection amount, the fuel injection timing, and the in-cylinder state functions (temperature, EGR ratio, etc.) are determined in advance, and the ignition timing is determined based on these target values. For example, the ignition timing for achieving the target θci is determined based on a deviation of the standard θci from the target θci and the in-cylinder state functions at the specific crank angle timing.

That is, as the deviation of the standard θci from the target θci is larger, the ignition timing needs to be deviated greater from an initial target value of the ignition timing determined corresponding to the standard θci (hereinafter, referred to as "default ignition timing"). Further, as the in-cylinder state functions at the specific crank angle timing deviate greater from the target values, the ignition timing still needs to be deviated greater from the default ignition timing. On the other hand, as described at S1, in this embodiment, since the initial target values are adopted as they are as the fuel injection amount and the fuel injection timing, the deviations of the fuel injection amount and the fuel injection timing are not required to be taken into consideration. At S6, by using a given arithmetic expression prepared in advance in view of the above situation, the ignition timing of the spark plug 16 is determined based on the deviation of the standard θci from the target θci and the deviation of the in-cylinder state functions from the target value. The in-cylinder state functions, that is, the temperature of the combustion chamber 6, the EGR ratio, etc. may be estimated based on, for example, the detection values of the second intake air temperature sensor SN6, the second intake air pressure sensor SN7, the pressure difference sensor SN8, etc. Note that when the target θci is the same as the standard θci and the in-cylinder state functions at the specific crank angle timing is the same as the target value, the default ignition timing is adopted as the ignition timing as it is.

Next, the ECU 100 shifts to S7 to estimate a combustion center of gravity which is a timing when a half of the mass (50% mass) of the total fuel injected into the combustion chamber 6 in one combustion cycle combusts, based on the fuel injection amount and the fuel injection timing determined at S1, the ignition timing determined at S6, and the in-cylinder state functions at the specific crank angle timing, and the engine speed. The estimation processing at S7 is performed based on an estimation model prepared in advance.

Next, the ECU 100 shifts to S8 to determine a given period including the combustion center of gravity estimated at S7 as a period in which the in-cylinder pressure for calculating the combustion noise index value at S10 described later is detected. The period in which the in-cylinder pressure is detected (hereinafter, referred to as "detection period") is determined to be a finite and continuous period including the combustion center of gravity. The detection period may be a period set based on time, or may be a period set based on the crank angle. In the case of using the crank angle, for example, a period from the crank angle advancing by 40° CA from the combustion center of gravity to the crank angle retarding by 40° CA therefrom as the detection period (see FIG. 13 described later).

Next, the ECU 100 shifts to S9 to cause the spark plug 16 to ignite at the ignition timing determined at S6, so as to trigger the SPCCI combustion of the mixture gas.

Next, the ECU 100 shifts to S10 to calculate the combustion noise index value based on the waveform of the in-cylinder pressure detected by the in-cylinder pressure sensor SN2 during the detection period determined at S8.

Figure 10:
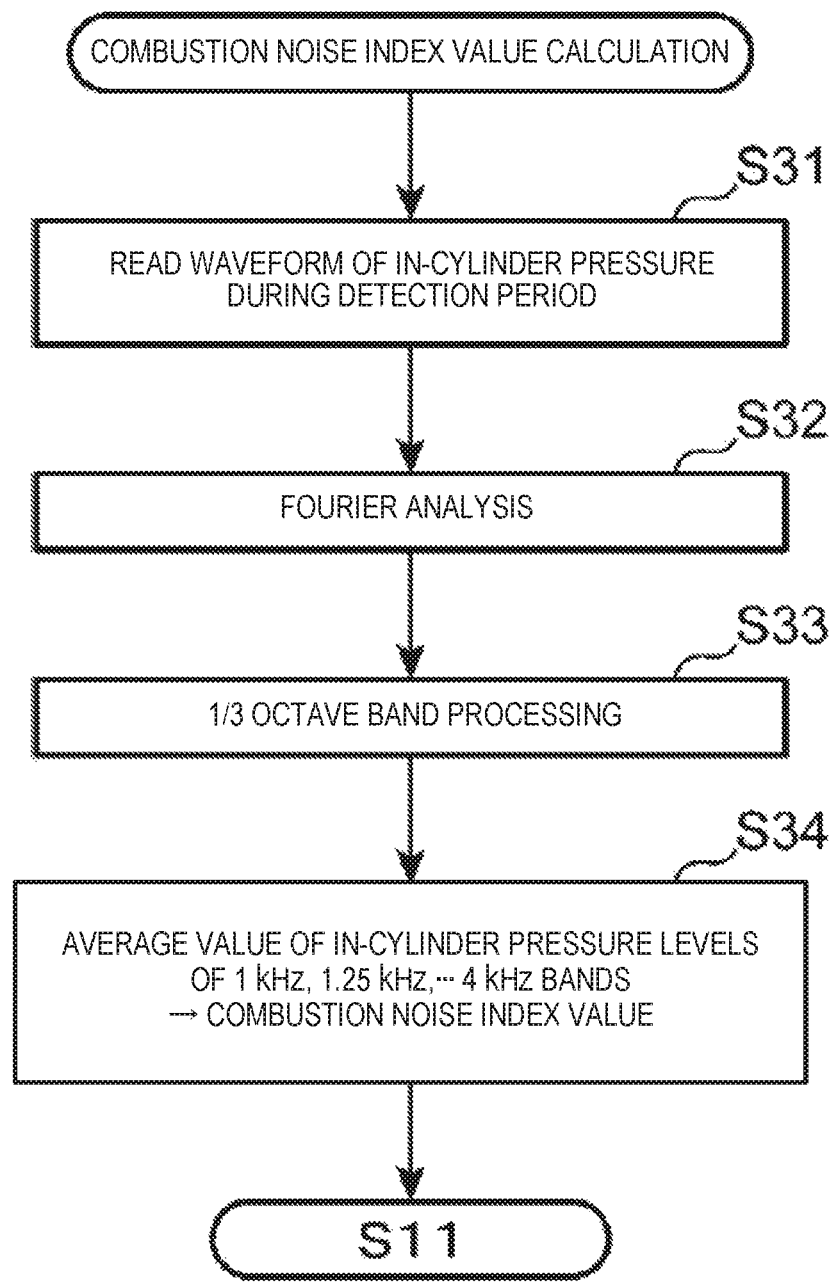
FIG. 10 is a subroutine illustrating details of the control at S10 of FIG. 8.

FIG. 10 is a subroutine illustrating details of a control at S10 where the noise index value is calculated. When the control illustrated in this subroutine starts, at S31, the ECU 100 reads the waveform of the in-cylinder pressure detected by the in-cylinder pressure sensor SN2 during the detection period.

Figure 13:
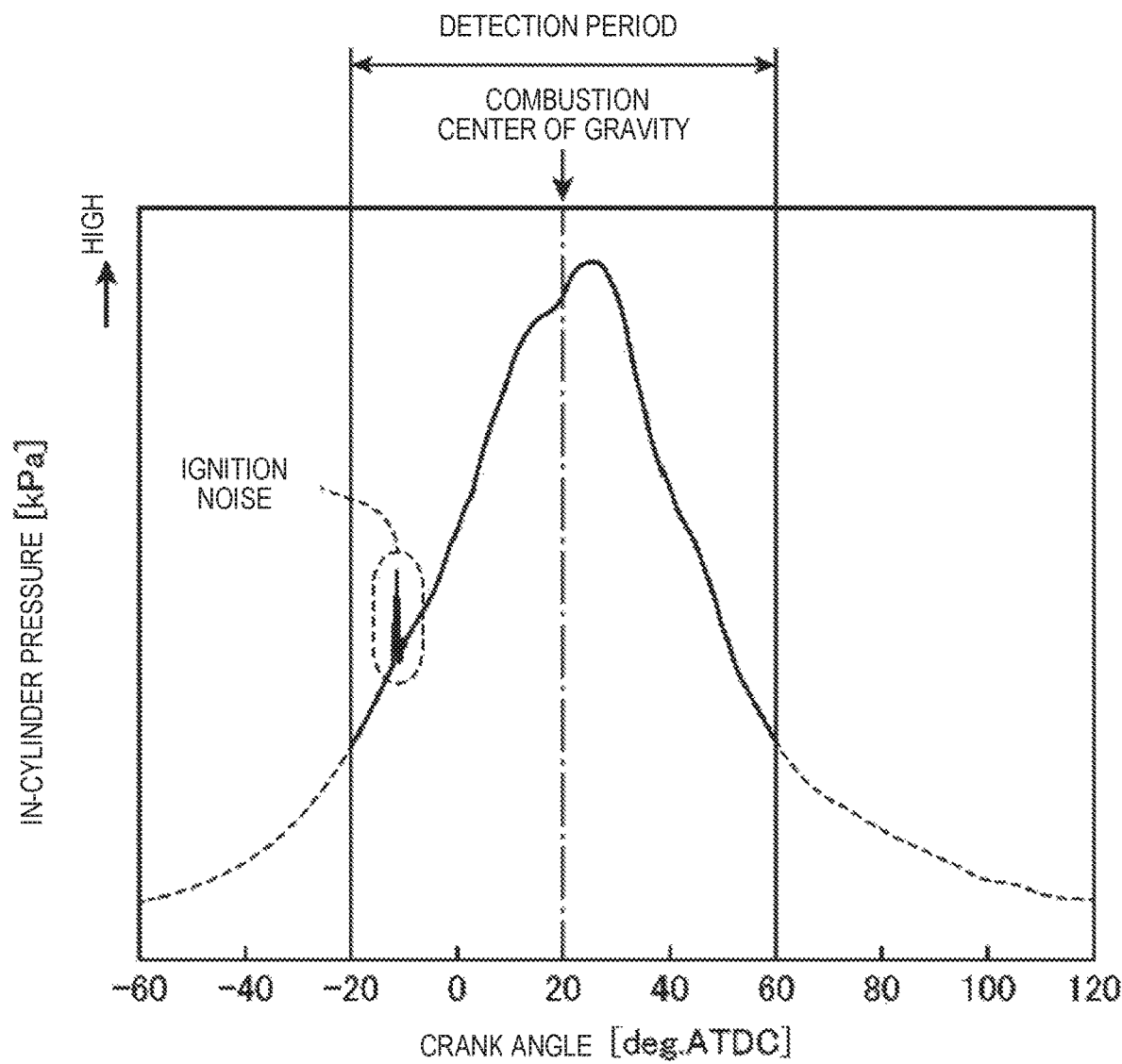
FIG. 13 is a chart illustrating a waveform of in-cylinder pressure detected by an in-cylinder pressure sensor.

FIG. 13 is a chart illustrating one example of the waveform of the in-cylinder pressure read at S31. Note that the crank angle displayed on the horizontal axis of the chart is the crank angle (deg. ATDC) when CTDC is 0° CA. In this example, the combustion center of gravity is estimated to be around ATDC 20° CA, and a period including 40° CA before and after the combustion center of gravity (a period from ATDC 20° CA to ATDC 60° CA) is set as the detection period. The detected waveform within this detection period includes ignition noise which is noise caused by the ignition of the spark plug 16.

Next, the ECU 100 shifts to S32 to perform Fourier-analysis on a detected waveform of the in-cylinder pressure read at S31 and obtain an amplitude for each frequency component. Note that, as pre-processing of the Fourier analysis, processing of applying a window function for removing the ignition noise is performed on the detected waveform of the in-cylinder pressure. For example, a function generally used for Fourier analysis (e.g., Hanning window function) may be modified so that the function value becomes zero for a given period set around the ignition timing, and it may be used as the window function.

Figure 14:
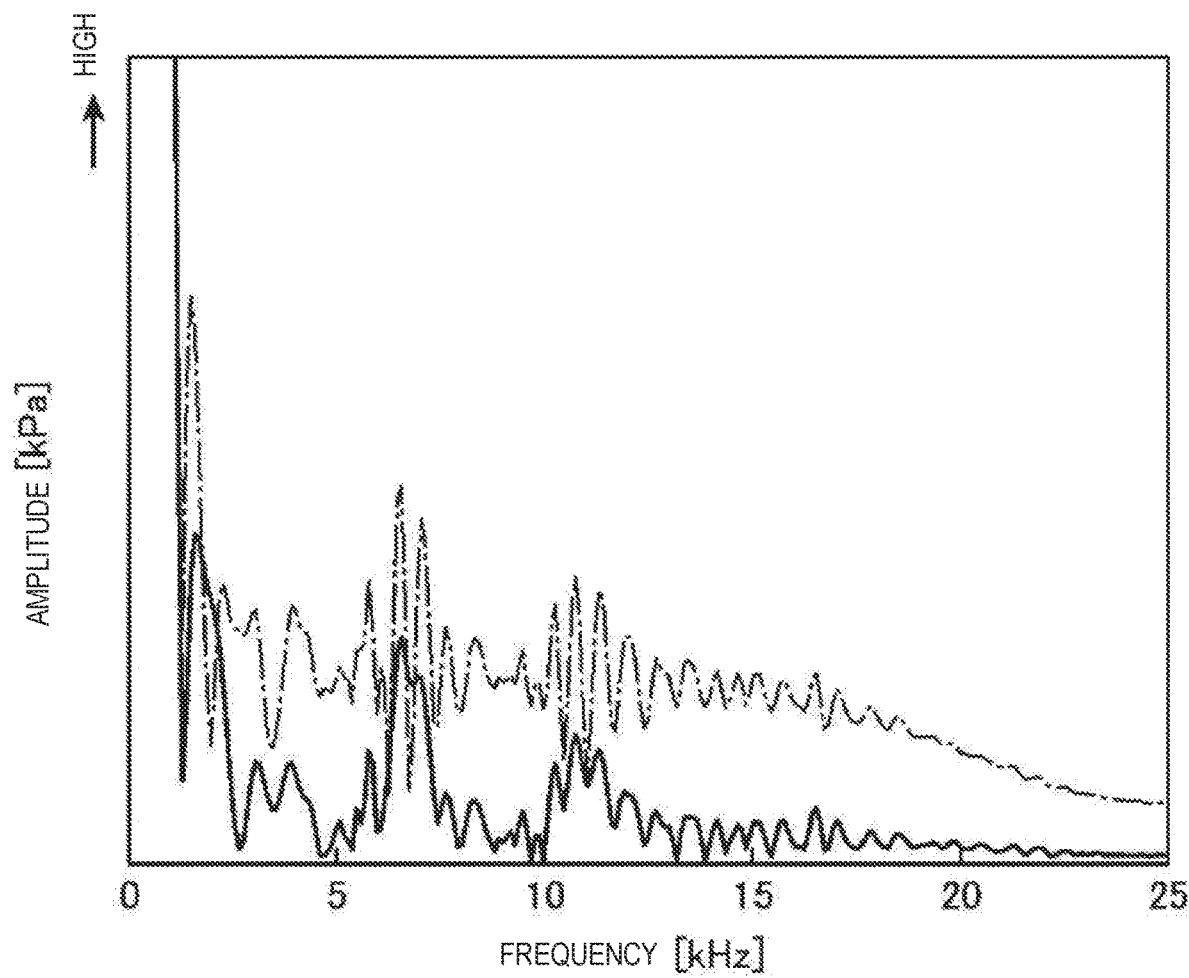
FIG. 14 is a chart illustrating a result of performing Fourier analysis on the pressure waveform of FIG. 13.

FIG. 14 is a chart illustrating a frequency spectrum obtained by the Fourier analysis performed at S32. Since the ignition noise is removed from the detected waveform by the pre-processing (the application of the window function) in the Fourier analysis as described above, the frequency spectrum obtained by Fourier-analyzing the waveform after the ignition noise removal (solid line) is different from a frequency spectrum obtained in a case where the ignition noise is not removed (dashed line). That is, according to the method of at S32 where the ignition noise is removed and then the Fourier analysis is conducted, unnecessary frequency components caused by the ignition noise do not mix in and the original frequency component in the waveform of the in-cylinder pressure is accurately extracted.

Figure 15:
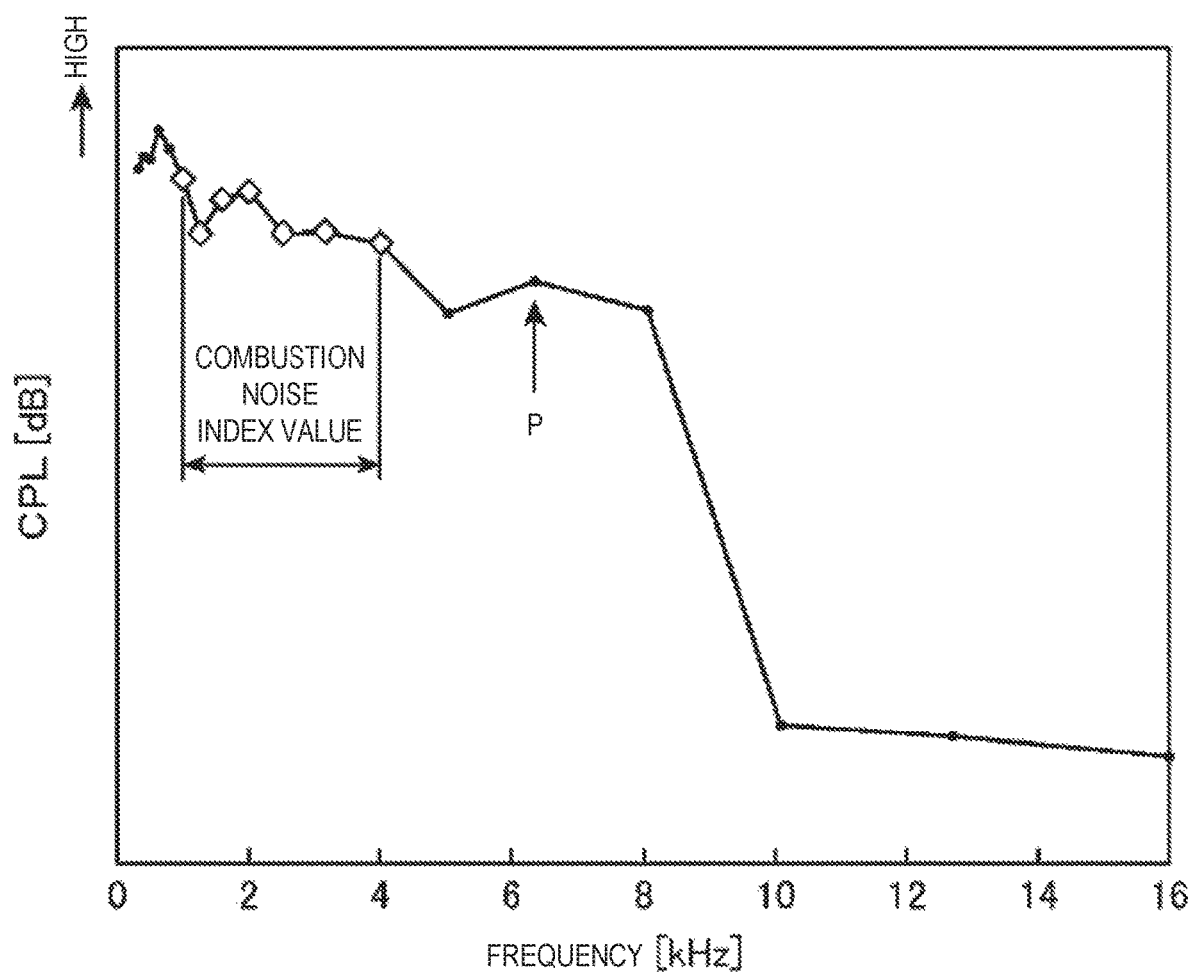
FIG. 15 is a chart illustrating a result of performing ⅓ octave band processing on a frequency spectrum of FIG. 14.

Next, the ECU 100 shifts to S33 to perform ⅓ octave band processing on the result of the Fourier analysis at S32 (frequency spectrum). The ⅓ octave band processing is processing of dividing each octave range (a range from a certain frequency to a frequency twice thereof) of the frequency spectrum into three and calculating an in-cylinder pressure level (CPL) of each divided band. Thus, as illustrated in FIG. 15, for example, the in-cylinder pressure level of each of the bands having center frequencies of 1 kHz, 1.25 kHz, 1.6 kHz, 2 kHz, 2.5 kHz, 3.15 kHz, 4 kHz, 5 kHz, 6.3 kHz, 8.0 kHz, . . . , respectively, is specified.

Subsequently, the ECU 100 shifts to S34 to calculate the combustion noise index value based on the result of the ⅓ octave band processing (FIG. 15) at S33. For example, the ECU 100 calculates, as the noise index value, an average value of in-cylinder pressure levels indicated by diamond shaped plots in FIG. 15, i.e., the in-cylinder pressure levels of the bands having the center frequencies of 1 kHz, 1.25 kHz, 1.6 kHz, 2 kHz, 2.5 kHz, 3.15 kHz, and 4 kHz.

Here, the noise having a frequency of 1 to 4 kHz is highly correlated with the CI knock caused by the CI combustion, as described above. However, it is known that if this noise of 1 to 4 kHz is sufficiently reduced, the SI knock caused by the SI combustion and noise near 6.3 kHz, which is highly correlated with SI knock are also sufficiently reduced. In other words, although the noise of 1 to 4 kHz originally indicates the noise equivalent to about the CI knock, due to the above circumstances, it can be treated as noise indicating that equivalent to both CI knock and SI knock. Therefore, in this embodiment, an average value of the in-cylinder pressure levels in the bands of 1 to 4 kHz (1 kHz, 1.25 kHz, . . . , 4 kHz) is calculated and used as the combustion noise index value for reducing the CI knock and the SI knock. On the other hand, the in-cylinder pressure level in the 6.3 kHz band (labeled as "P" in FIG. 15) is not considered as the combustion noise index value.

Once the calculation of the combustion noise index value is completed as described above, the ECU 100 shifts to S11 of FIG. 8 to calculate and update the standard deviation of the combustion noise index value based on the latest combustion noise index value calculated at S34 and the plurality of combustion noise index values accumulated previously. Next, the standard deviation updated in this manner is used as the margin y (FIG. 11) when determining the final reference value Wx of the combustion noise index value. Note that the standard deviation of the combustion noise index value may be obtained from the combustion noise index values accumulated, for example, over a latest given period or separately for every similar operating condition.

Next, the ECU 100 shifts to S12 to calculate the combustion center of gravity based on the waveform of the in-cylinder pressure during the detection period and correct the estimation model of the combustion center of gravity based on the calculated combustion center of gravity. That is, the ECU 100 calculates the heat generation amount accompanying the combustion for each crank angle based on the waveform of the in-cylinder pressure detected by the in-cylinder pressure sensor SN2 during the detection period, and the combustion center of gravity at the timing when 50% mass of the fuel combusts is calculated based on the data of the heat generation amount for each crank angle. Further, the estimation model for estimating the combustion center of gravity is corrected based on the deviation between this calculated combustion center of gravity and the combustion center of gravity estimated at S7. The correction of this estimation model leads to improving the accuracy in estimating the combustion center of gravity under the similar condition next time and thereafter (the reduction of the deviation between the estimated value and the actual value).

(6) Operations and Effects

As described above, in this embodiment, during the SPCCI combustion (i.e., while driving within the first and second operating ranges A1 and A2), the control for adjusting the ignition timing so that the combustion noise index value does not exceed the reference value W, etc. are executed based on the combustion noise index value which is identified based on the in-cylinder pressure detected by the in-cylinder pressure sensor SN2, and the reference value W (more specifically, the final reference value Wx obtained by subtracting the margin y from the reference value W) determined beforehand as the upper limit of the combustion noise index value. The reference value W is set higher as the vehicle speed or the engine load increases. This configuration is an advantageous in that the combustion is suitably controlled in consideration of the combustion noise which is actually perceived by the passenger.

When the vehicle speed or the engine load is high, compared to when it is low, the sound transmitted inside a cabin as the vehicle travels and the engine operates (hereinafter, referred to as "background noise") increases and other sounds are mixed with this background noise and are not easily perceived. Therefore, hypothetically if the combustion noise of the engine is fixed, the level of the combustion noise actually perceived by the passenger decreases as the vehicle speed or the engine load increases. In consideration of this, in this embodiment, the reference value W of the combustion noise index value is set higher as the vehicle speed or the engine load increases, and the combustion is controlled based on the reference value W. Therefore, the ratio of the CI combustion is increased as much as possible while keeping the combustion noise which is actually perceived by the passenger to an adequate level.

Figure 16A:
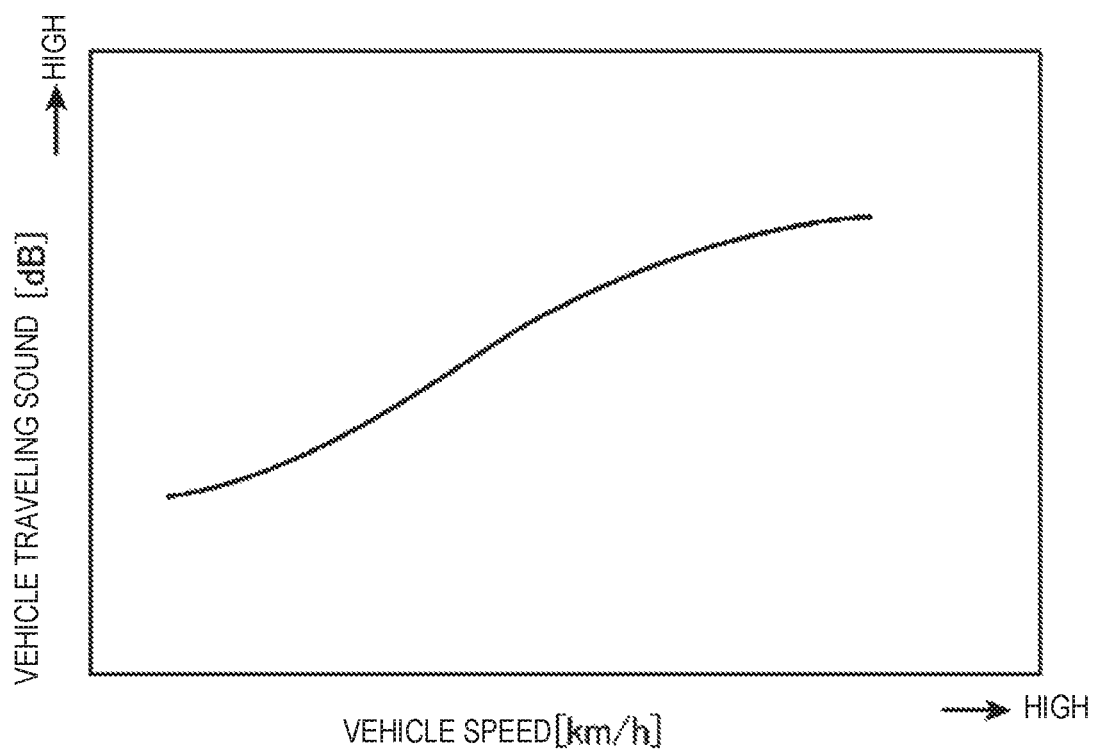
Figure 16B:
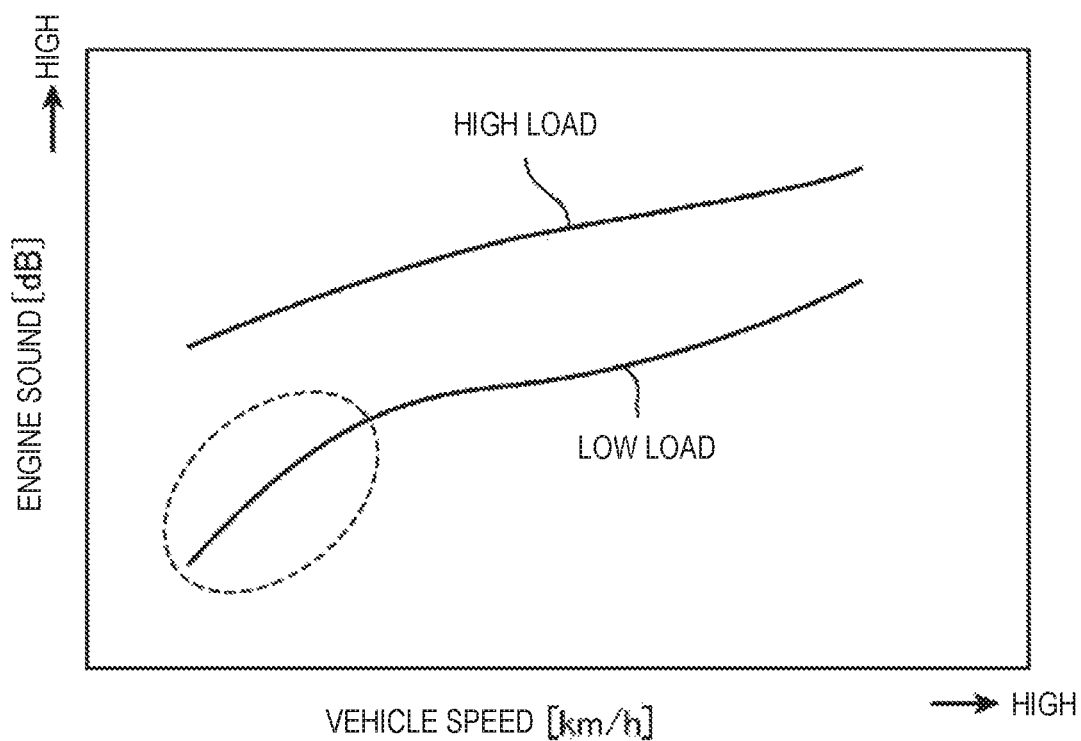

FIGS. 16A and 16B illustrate that the sound pressure (SPL) of the background noise transmitted into the cabin changes depending on a condition. Specifically, FIG. 16A is a chart illustrating a relationship between the vehicle traveling sound, which is transmitted into the cabin, and the vehicle speed. Further, FIG. 16B is a chart illustrating the relationship between the engine sound, which is transmitted into the cabin, and the engine speed for two kinds of engine loads. The line chart described as "HIGH LOAD" indicates a change in the engine sound when the engine speed is changed while keeping the engine load at a certain high load. The line chart described as "LOW LOAD" indicates a change in the engine sound when the engine speed is changed while keeping the engine load at a certain low load. Note that the traveling sound of the vehicle illustrated in FIG. 16A is a mixed sound of wind, road noise, etc., and the engine sound illustrated in FIG. 16B is a mixed sound of machines of the engine (e.g., a friction sound of a rotational component), combustion, exhaustion, etc.

As illustrated in FIG. 16A, the traveling sound of the vehicle increases as the vehicle speed increases. Moreover, as illustrated in FIG. 16B, the engine sound increases as a whole as the engine load increases, and while the engine load is fixed, the engine sound increases as the engine speed increases (i.e., as the vehicle speed increases). Here, since the background noise transmitted into the cabin is the mixture of the traveling sound of the vehicle and the engine sound, based on the result of FIGS. 16A and 16B, the background noise can be said to increase when either one of the vehicle speed and the engine load increases. That is, the background noise takes a lowest value when the vehicle speed and the engine load are both low, and takes a highest value when the vehicle speed and the engine load are both high.

In this embodiment, the reference value W of the combustion noise index value is set in proportion to both the vehicle speed and the engine load (to increase as either one of the vehicle speed and the engine load increases) in consideration of the tendency of the background noise described above (the traveling sound of the vehicle and the engine sound). According to this embodiment in which the combustion is controlled based on the reference value W set in such a manner, the ratio of the CI combustion is increased as much as possible while keeping the combustion noise which is actually perceived by the passenger (i.e., the combustion noise perceived by the passenger without being mixed with the background sound) to an adequate level.

For example, when the reference value W is set uniformly disregarding the vehicle speed and the engine load, the reference value W needs to be set sufficiently low so that the combustion noise is not easily perceived by the passenger even when the background noise takes the smallest value, i.e., when the vehicle speed is low and the engine is low. However, by doing this, the combustion is constantly controlled based on the low reference value W, the ratio of the CI combustion may decrease significantly and the fuel efficiency improving effect may drop. In this regard, as in this embodiment, when the reference value W is set to increase as the vehicle speed or the engine load increases, since the ratio of the CI combustion is not lowered excessively (the SI ratio is excessively increased) to reduce the combustion noise more than necessary, while the comfort of the passenger is properly secured, the ratio of the CI combustion is increased as much as possible to effectively improve the fuel efficiency.

Further in this embodiment, the map M1 for determining the reference value W of the combustion noise index value is prepared including the first characteristic Q1 defining the reference value W1 when the engine load is the fixed low load and the second characteristic Q2 defining the reference value W2 when the engine load is the fixed high load. When determining the reference value W of the combustion noise index value, the reference value W corresponding to the current operation condition is identified by the interpolation processing (linear interpolation) using the reference values W1 and W2 defined for the first and second characteristics Q1 and Q2. According to this configuration, since there is no need to store characteristics of the multiple reference values W corresponding to various engine load conditions in advance, while avoiding an unnecessary increase in the data amount to be stored, the reference values W in various engine load conditions are properly determined by the interpolation processing.

Moreover in this embodiment, the reference value W1 defined by the first characteristic Q1 for low load is set so that its change rate with respect to the vehicle speed is larger in the vehicle speed range below a given value V0 (low vehicle speed range) than in the vehicle speed range including the given value V0 and higher (high vehicle speed range). Therefore, the suitable reference value W is set in consideration of the characteristic that the engine sound transmitted into the cabin changes non-linearly with respect to the engine speed (or the vehicle speed), and the combustion noise is kept at an adequate level by using the reference value W.

For example, with reference to FIG. 16B, it can be understood that the engine sound transmitted into the cabin when the engine load is low (the line chart described with "LOW LOAD") sharply increases as the engine speed increases especially within a low engine speed range (the section circled by a dash line). In other words, the change rate (increase rate) of the engine sound with respect to the engine speed increases as the engine speed decreases. This is because, in the low engine load and low engine speed conditions, due to the mechanical sound of the engine (e.g., the friction sound of the rotational component), the combustion sound, and the exhaust sound all being small, when the engine speed increases from this state, all of the three kinds of sound increase as the engine speed increases, and as a result, the engine sound combined the three kinds of sound relatively sharply increase. Therefore, as in this embodiment, when the first characteristic Q1 as the characteristic of the reference value for low load is set so that the reference value increases relatively sharply within the low vehicle speed range in which the engine speed naturally decreases, the suitable reference value W taking into consideration such characteristic of the engine sound (nonlinear characteristics) is determined.

In this embodiment, the target θci, which is the target start timing of the CI combustion (the switch timing from the SI combustion to the CI combustion), is determined so that the combustion noise index value does not exceed the reference value W, and the ignition timing is controlled to achieve the determined target θci. Therefore, by adjusting the target θci having a large influence on the combustion noise index value, the ratio of the CI combustion is increased as much as possible while keeping the combustion noise adequately.

(7) Modifications

Figure 17:
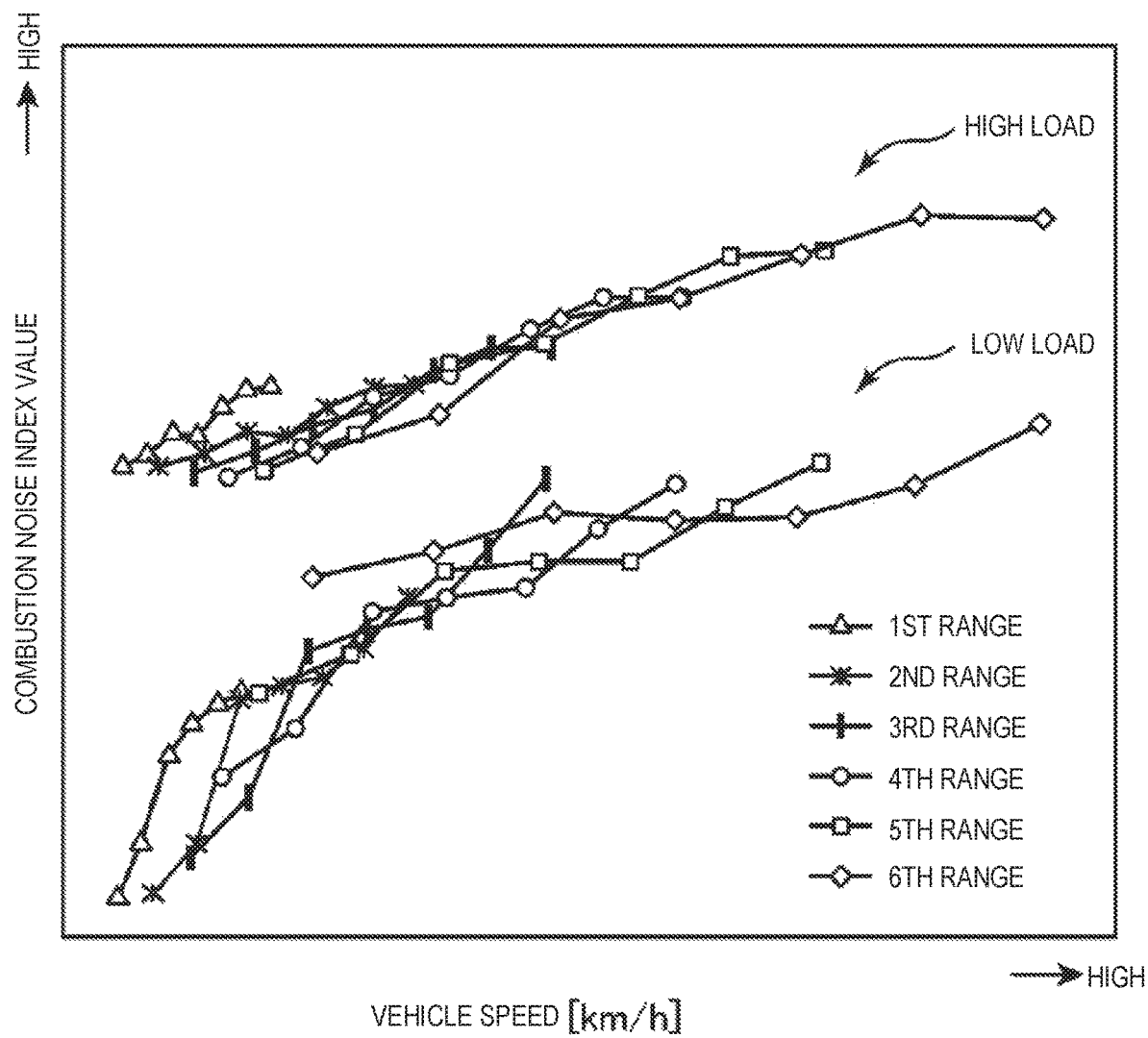
FIG. 17 is a chart corresponding to FIG. 11, illustrating a modification of the embodiment.

In this embodiment, the map M1 including the first characteristic Q1 defining the reference value W1 when the engine load is the fixed low load and the second characteristic Q2 defining the reference value W2 when the engine load is the fixed high load is prepared in advance, and the reference value W of the combustion noise index value conforming to the operating condition at each time point is determined based on the map M1. Alternatively, for example, as illustrated in FIG. 17, a plurality of independent characteristics corresponding to a gear position of a transmission mounted on the vehicle (1st to 6th ranges in this example) may be prepared for low load and high load, respectively. Note that in the case of the vehicle equipped with six forward ranges as illustrated in FIG. 17, twelve characteristics including six characteristics for low loads and six characteristics for high loads are prepared.

Further in this embodiment, two characteristics including the characteristic for low load (the first characteristic Q1) and the characteristic for high load (the second characteristic Q2) are prepared. However, three characteristics of low load, medium load, and high load may be prepared, or four or more characteristics may be prepared.

Furthermore, in this embodiment, the reference value W when the vehicle speed is changed in a plurality of engine load conditions (low load and high load) is identified based on the characteristics Q1 and Q2. However, since the vehicle speed and the engine speed are in a certain relationship (deciding one of them decides the other one as well), a characteristic defining the change of the reference value W with respect to the engine speed (not the vehicle speed) may be prepared. In this case, the reference value W is naturally set higher as the engine speed is higher.

Although in this embodiment, the combustion noise index value is specified based on the in-cylinder pressure detected by the in-cylinder pressure sensor SN2 (detector), the parameter which needs to be detected in order to specify the combustion noise index value may be any parameter as long as it relates to noise accompanying combustion, and the in-cylinder pressure is merely one example. For example, vibration (vibration acceleration) of the engine body 1 or noise itself which the engine body 1 produces may be detected as the parameter. That is, the detector of the present disclosure may use, other than the in-cylinder pressure, a vibration sensor configured to detect the vibration of the engine body 1, a noise sensor configured to detect noise, etc.

In this embodiment, based on the in-cylinder pressure detected by the in-cylinder pressure sensor SN2, the average value of the in-cylinder pressure levels highly correlated with the CI knock, more specifically, the in-cylinder pressure levels of the bands of 1 kHz, 1.25 kHz, 1.6 kHz, 2 kHz, 2.5 kHz, 3.15 kHz, and 4 kHz, which are obtained by Fourier-analyzing the detected waveform of the in-cylinder pressure, is calculated and this average value is used as the combustion noise index value; however, a highest value of the in-cylinder pressure levels in these bands may alternatively be calculated as the noise index value. Further, since the CI knock is a resonance phenomenon with the engine components, and resonance frequencies are naturally limited to a few frequencies, the noise index value may be calculated using only the in-cylinder pressure levels in a limited band closest to each resonance frequency. In other words, the in-cylinder pressure levels in a part of each band far from the resonance frequency may be disregarded.

In addition, the combustion noise index value is not limited to the value obtained based on the in-cylinder pressure levels of the 1 to 4 kHz bands as described above. For example, a first combustion noise index value may be calculated based on the in-cylinder pressure levels of the 1 to 4 kHz bands (i.e., highly correlated with the CI knock), a second combustion noise index value may be calculated based on the in-cylinder pressure of the 6.3 kHz band, which is highly correlated with the SI knock, is calculated, and the SPCCI combustion may be controlled based on both of the first and second noise index values. Alternatively, a higher one of the first and second combustion noise index values may be used.

Although in this embodiment, the target θci (the target value of the start timing θci of the CI combustion) with which the combustion noise index value does not exceed the reference value W (more specifically, the final reference value Wx obtained by subtracting the margin y from the reference value W) is set and the ignition timing by the spark plug 16 (the spark-ignition timing) is adjusted to achieve the target θci, alternatively/additionally to the ignition timing, the fuel injection timing from the injector 15 may be adjusted. Furthermore, both the fuel injection timing and the fuel injection amount may be adjusted.

Further in another mode, a feedback control may be executed based on the combustion noise index value, e.g., the combustion noise index value identified in each combustion cycle may be compared with the reference value W, and if the combustion noise index value exceeds the reference value W, the ignition timing is retarded from the next cycle.

Although in this embodiment, the booster 33 mechanically driven by the engine body 1 is provided in the intake passage 30, instead of such a mechanical booster 33 (supercharger), an electric booster driven by a motor, or a turbocharger driven by the energy of the exhaust gas may be provided.

Although in this embodiment, the cavity 20 having a donut shape in the plan view to surround the conical-shaped bulge portion 20a is formed in the crown surface of the piston 5, the concave portion of the cavity 20 facing the spark plug 16, that is, the concave portion located on the intake side of the bulge portion 20a, may be formed so as to be smaller than the concave portion on the opposite side (exhaust side). In this manner, when the fuel is injected from the injector 15 in the final stage of the compression stroke, fuel spray is moved to the vicinity of the electrode of the spark plug 16 more promptly.

Although in this embodiment, the intake and exhaust VVTs 13a and 14a are controlled to form the valve overlap period in which both the intake and exhaust valves 11 and 12 are opened over TDC of the exhaust stroke when performing the internal EGR in which the burned gas is left in the combustion chamber 6, conversely, the internal EGR may be performed by forming a so-called negative overlap period in which both the intake and exhaust valves 11 and 12 are closed over TDC of the exhaust stroke.

In this embodiment, the swirl valve 18 is provided to one of the two intake ports 9A and 9B (the second intake port 9B) provided to one cylinder 2, and the opening of the swirl valve 18 is changed to adjust the strength of the swirl flow. However, the method of adjusting the strength of the swirl flow is not limited to this. For example, the strength of the swirl flow may be adjusted by setting the lift amount of the intake valve 11 which opens and closes the first intake port 9A and the lift amount of the intake valve 11 which opens and closes the second intake port 9B different from each other or the operating timings of these two intake valves 11 different from each other.

Although in this embodiment, the target values of the control amounts, such as the ignition timing, are determined in advance to achieve the target combustion center of gravity and the target SI ratio determined for each operating condition, and the ignition timing is corrected as needed so that an estimated combustion noise index value is equal to or lower the reference value W. Additionally (or alternatively), a feedback control based on the combustion center of gravity or the SI ratio may be executed.

For example, when executing the feedback control based on the combustion center of gravity, the combustion center of gravity is calculated for each combustion (SPCCI combustion) based on the detected waveform of the in-cylinder pressure sensor SN2, etc., and when the calculated combustion center of gravity deviates from the target combustion center of gravity, the ignition timing, the injection amount/timing, etc. are corrected to reduce the deviation.

Similarly, when performing the feedback control based on the SI ratio, the SI ratio in each combustion is calculated based on the detected waveform of the in-cylinder pressure sensor SN2 etc., and when the calculated SI ratio deviates from the target SI ratio, the ignition timing, the fuel injection amount/timing, etc. are corrected to reduce the deviation.

Note that, when calculating the SI ratio of each combustion as described above, various specific methods can be considered to calculate this SI ratio.

For example, the heat generation rate at each crank angle timing may be calculated from the detected waveform by the in-cylinder pressure sensor SN2, and the areas R1 and R2 illustrated in FIG. 7 may be calculated based on the data (waveform) of the calculated heat generation rate. In this case, although the SI ratio may be calculated as SI ratio=R1/(R1+R2) as described above, alternatively, SI ratio=R1/R2 may be established.

Figure 18:
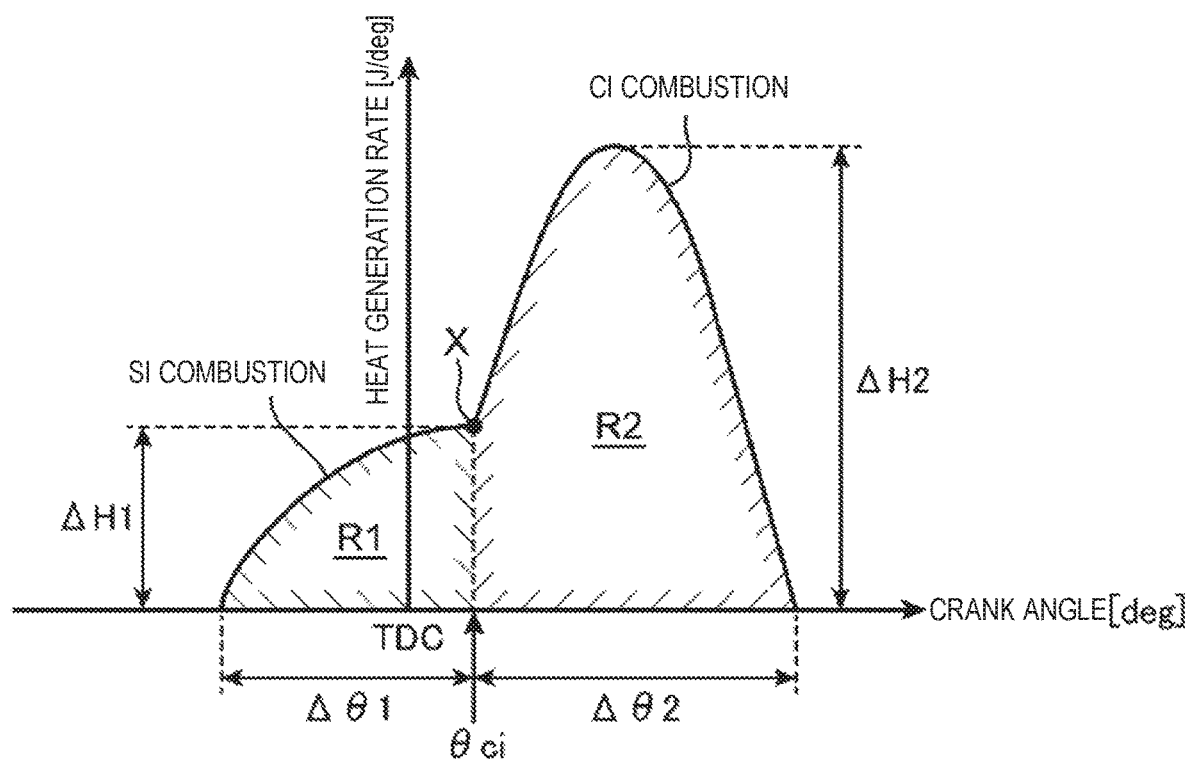
FIG. 18 is a chart corresponding to FIG. 7, illustrating various defining methods of an SI ratio.

Further, the SI ratio may be calculated using A01 and A02 illustrated in FIG. 18. That is, when the crank angle period of the SI combustion (the crank angle period on the advancing side of the flection point X) is Δθ1 and the crank angle period of the CI combustion (the crank angle period on the retarding side of the flection point X) is Δθ2, SI ratio=Δθ1+Δθ2) or SI ratio=Δθ1/Δθ2 may be established.

Furthermore, when a peak of the heat generation rate of the SI combustion is ΔH1 and a peak of the heat generation rate of the CI combustion is ΔH2, SI ratio=ΔH1/(ΔH1+ΔH2) or SI ratio=ΔH1/ΔH2 may be established.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Engine Body
2 Cylinder
15 Injector
16 Spark Plug
100 ECU (Combustion controller)
SN2 In-cylinder Pressure Sensor (Detector)
Q1 First Characteristic
Q2 Second Characteristic
W Reference Value (of Combustion Noise Index Value)

What is claimed is:

1. A control device for an on-board compression-ignition engine in which partial compression-ignition combustion including spark ignition (SI) combustion performed by combusting a portion of a mixture gas inside a cylinder by spark ignition followed by compression ignition (CI) combustion performed by causing the remaining mixture gas inside the cylinder to self-ignite is executed within at least a part of an operating range of the engine, comprising:
a detector configured to detect a parameter related to noise caused by the combustion inside the cylinder, the detector being an in-cylinder pressure sensor configured to detect pressure inside the cylinder as the parameter; and
a combustion controller configured to:
control the combustion inside the cylinder during the partial compression-ignition combustion based on a combustion noise index value identified by the detected parameter of the detector and a given reference value defined as an upper limit of the combustion noise index value, the combustion controller controlling the reference value to increase as a vehicle speed increases,
calculate and update a margin of the combustion noise index value based on combustion noise index values accumulated previously, determine a final reference value of the combustion noise index value based on both of the combustion noise index value corresponding to a current operating condition and the margin, and control a CI combustion timing based on the final reference value, wherein the reference value is set so that a change rate of the reference value when the vehicle speed changes while an engine load remains unchanged is larger in a low speed range in which the vehicle speed is below a given value than in a high speed range in which the vehicle speed is the given value or higher.

2. The device of claim 1, wherein a first characteristic that defines the reference value when the engine load is fixed at a low load and a second characteristic that defines the reference value when the engine load is fixed at a high load, are defined in advance, and wherein at least the first characteristic is set so that the change rate of the reference value with respect to the vehicle speed is larger in the low speed range than in the high speed range.

3. The device of claim 2, wherein when the engine load currently falls neither within the low load nor the high load, the combustion controller identifies the reference value corresponding to a current engine load by an interpolation processing using the reference values defined for the first characteristic and the second characteristic.

4. The device of claim 1, wherein the combustion controller determines a target start timing that is a target start timing of the CI combustion as a timing at which the combustion noise index value does not exceed the reference value, and controls the combustion inside the cylinder so as to achieve the determined target start timing.

5. A control device for an on-board compression-ignition engine in which partial compression-ignition combustion including spark ignition (SI) combustion performed by combusting a portion of a mixture gas inside a cylinder by spark ignition followed by compression ignition (CI) combustion performed by causing the remaining mixture gas inside the cylinder to self-ignite is executed within at least a part of an operating range of the engine, comprising:

a detector configured to detect a parameter related to noise caused by the combustion inside the cylinder; and a combustion controller configured to control the combustion inside the cylinder during the partial compression-ignition combustion based on a combustion noise index value identified by the detected parameter of the detector and a given reference value defined as an upper limit of the combustion noise index value, the combustion controller controlling the reference value to increase as an engine load increases, wherein the reference value is determined as a first characteristic when the engine load is fixed at a low load, the reference value is determined as a second characteristic when the engine load is fixed at a high load, the detector is an in-cylinder pressure sensor, and the reference value is further determined based on a plurality of independent characteristics corresponding to gear positions of a transmission mounted in a vehicle that are provided for each of the first characteristic and the second characteristic.

6. The device of claim 5, wherein the combustion controller further controls the reference value to increase as an engine speed increases.

* * * * *